(12) United States Patent
Thomsen

(10) Patent No.: US 10,329,125 B2
(45) Date of Patent: Jun. 25, 2019

(54) SYSTEMS AND METHODS FOR HANDLING CLEANING

(71) Applicant: Christian E Thomsen, Seattle, WA (US)

(72) Inventor: Christian E Thomsen, Seattle, WA (US)

( * ) Notice: Subject to any disclaimer, the term of this patent is extended or adjusted under 35 U.S.C. 154(b) by 0 days.

(21) Appl. No.: 15/859,868

(22) Filed: Jan. 2, 2018

(65) Prior Publication Data
US 2018/0194598 A1 Jul. 12, 2018

Related U.S. Application Data

(63) Continuation of application No. 15/294,721, filed on Oct. 15, 2016, now Pat. No. 9,856,115, which is a continuation-in-part of application No. 14/745,412, filed on Jun. 20, 2015, now Pat. No. 9,764,929.

(60) Provisional application No. 62/051,671, filed on Sep. 17, 2014.

(51) Int. Cl.
*B66B 31/02* (2006.01)
*B08B 1/00* (2006.01)
*B08B 1/02* (2006.01)
*B08B 3/04* (2006.01)
*B62B 3/02* (2006.01)

(52) U.S. Cl.
CPC ............. *B66B 31/02* (2013.01); *B08B 1/006* (2013.01); *B08B 1/02* (2013.01); *B08B 3/041* (2013.01); *B62B 3/02* (2013.01); *B62B 2202/50* (2013.01)

(58) Field of Classification Search
CPC .......... B08B 1/006; B08B 3/041; B66B 31/02
See application file for complete search history.

(56) References Cited

U.S. PATENT DOCUMENTS 3,946,853 A * 3/1976 Ishida ................... B66B 31/02
198/494
7,041,195 B2 5/2006 McLeod et al.
7,194,783 B1 * 3/2007 Hunt ....................... A47L 4/02
15/321

(Continued)

FOREIGN PATENT DOCUMENTS

AU 2011100760 A4 * 8/2011 ......... E04D 13/0765

OTHER PUBLICATIONS

Office Action for U.S. Appl. No. 15/977,978, dated Sep. 6, 2018, Christian E. Thomsen, "Systems and Methods for Handrail Cleaning", 8 pages.

*Primary Examiner* — Shay Karls
(74) *Attorney, Agent, or Firm* — Lee & Hayes, P.C.

(57) ABSTRACT

A system for cleaning and conditioning handrails. A cleaning pad is curved to approximate the shape of a handrail, and is disposed on an arm. The arm may be mounted on a support structure, allowing it to be rolled up to an escalator handrail and left to do the cleaning while the escalator runs. When mounted, the arm may include a spring or piston to keep the arm in a particular position. A second cleaning pad may be included to dry or polish the handrail, the handrail going first through the cleaning pad and second through the drying pad. The arm may be hand-held, allowing a user to reach up or down steps or an incline. The cleaning pad may be mounted such that it rotates about the arm for storage, maintenance or better reach, such as around bends or corners.

19 Claims, 22 Drawing Sheets

(56) References Cited

U.S. PATENT DOCUMENTS

| | | | |
|---|---|---|---|
| 7,389,866 B2* | 6/2008 | Kawasaki | B66B 31/02 198/335 |
| 7,430,781 B2* | 10/2008 | Collins | A47L 4/02 15/220.3 |
| 8,261,401 B1* | 9/2012 | Ciesielski | A47L 4/02 15/104.93 |
| 9,364,136 B2* | 6/2016 | Devir | A47L 13/10 |
| 2018/0257913 A1 | 9/2018 | Thomsen | |

* cited by examiner

SYSTEMS AND METHODS FOR HANDLING CLEANING

PRIORITY CLAIM

This application claims the benefit of U.S. provisional patent application No. 62/051,671, filed Sep. 17, 2014, to U.S. patent application Ser. No. 14/745,412, filed Jun. 20, 2015, and to U.S. patent application Ser. No. 15/294,721, filed Oct. 15, 2016. The foregoing applications are incorporated in their entirety as if fully set forth herein.

FIELD OF THE INVENTION

This invention relates generally to handrails, and, more specifically, to systems and methods for handrail cleaning.

BACKGROUND

Handrails are used on stairwells, ADA ramps, escalators, and many walkways to help users maintain balance and safety. As such, handrails are contacted by human hands and all the elements carried thereon, as well as elements found in buildings and the outdoors. Handrails are shown to harbor bacteria and viruses, and therefore need to be cleaned regularly to maintain the health and safety of users, especially children, the elderly, and others who may be immunocompromised. Cleaning handrails can carry its own hazard, as one may be required to traverse lean out over the pathway in order to clean it. Moreover, cleaning handrails can be a time consuming though menial task, diverting human labor from more demanding tasks. The invention disclosed herein aims to simplify the handrail cleaning process by increasing productivity, safety, and ease of cleaning handrails.

SUMMARY

This invention relates generally to handrails, and, more specifically, to systems and methods for handrail cleaning. The system is comprised essentially of a cleaning pad and a means to deploy the cleaning pad.

In some embodiments, the system for cleaning a handrail comprises at least one strut with a far end and a near end; and at least one pad disposed on the far end of the strut. In some embodiments, the system further comprises a pad disposed on the far end of the strut which may be configured to wrap around at least a portion of the handrail. In some embodiments, the pad disposed on the far end of the strut substantially conforms to the shape of the handrail. In some embodiments, the pad disposed on the far end of the strut may be pivotably coupled with the strut. In some embodiments, the pad disposed on the far end of the strut may be configured to slide onto and off of the handrail at an end of the handrail. In some embodiments, the near end of the strut may include a handle. In some embodiments, the near end of the strut may be disposed on a support structure. In some embodiments, the near end of the strut may be pivotably disposed on a support structure. In some embodiments, system for cleaning a handrail may further comprise a first strut and a second strut, the second strut disposed below the first, wherein the near end of the second strut may be disposed on the support structure; a first pad and a second pad, the second pad disposed on the far end of the second strut; wherein the first pad and the second pad are substantially aligned through a vertical plane. In some embodiments, the support structure may be disposed on four wheels. In some embodiments, the four wheels may be casters. In other embodiments, two of the four wheels may be casters, and the other two wheels may not be casters.

In some embodiments, the system for cleaning a handrail comprises a support structure; a strut disposed on a forward portion of the support structure; a first pad, the first pad disposed on the strut; and a second pad, the second pad disposed on the strut below the first pad. In some embodiments, the system for cleaning a handrail comprises at least one support structure; at least one strut with a near end and a far end, wherein the near end may be disposed on a forward portion of the at least one support structure; at least one pad disposed on the far end of the at least one strut. In some embodiments, the first pad and the second pad may be disposed such that the first pad and second pad may be substantially aligned along a vertical plane. In some embodiments, the first pad and the second pad may be disposed such that a handrail travels first through the first pad and then through the second pad. In some embodiments, the strut may be further comprised of a substantially straight portion with a first end and a second end, wherein the first end may be coupled with the forward portion of the support structure; and a mounting bracket disposed on the second end of the strut, the bracket further comprising an upper mount and a lower mount. In some embodiments, the first pad may be disposed on the upper mount of the mounting bracket and the second pad may be disposed on the lower mount of the mounting bracket.

In some embodiments, the system for cleaning a handrail comprises a support structure; a strut with a first end and a second end, wherein the first end is disposed on the support structure; a mounting bracket with an upper mount and a lower mount, the mounting bracket disposed on the second end of the strut; a first pad disposed on the upper mount; and a second pad disposed on the lower mount. In some embodiments, the system for cleaning a handrail further comprises casters disposed on a front edge of the support structure. In some embodiments, the system for cleaning a handrail further comprises wheels disposed on a back edge of the support structure.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings.

DETAILED DESCRIPTION

This invention relates generally to handrails, and, more specifically, to systems and methods for handrail cleaning. Specific details of certain embodiments of the invention are set forth in the following description and in FIGS. 1-19 to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

Figure 1:
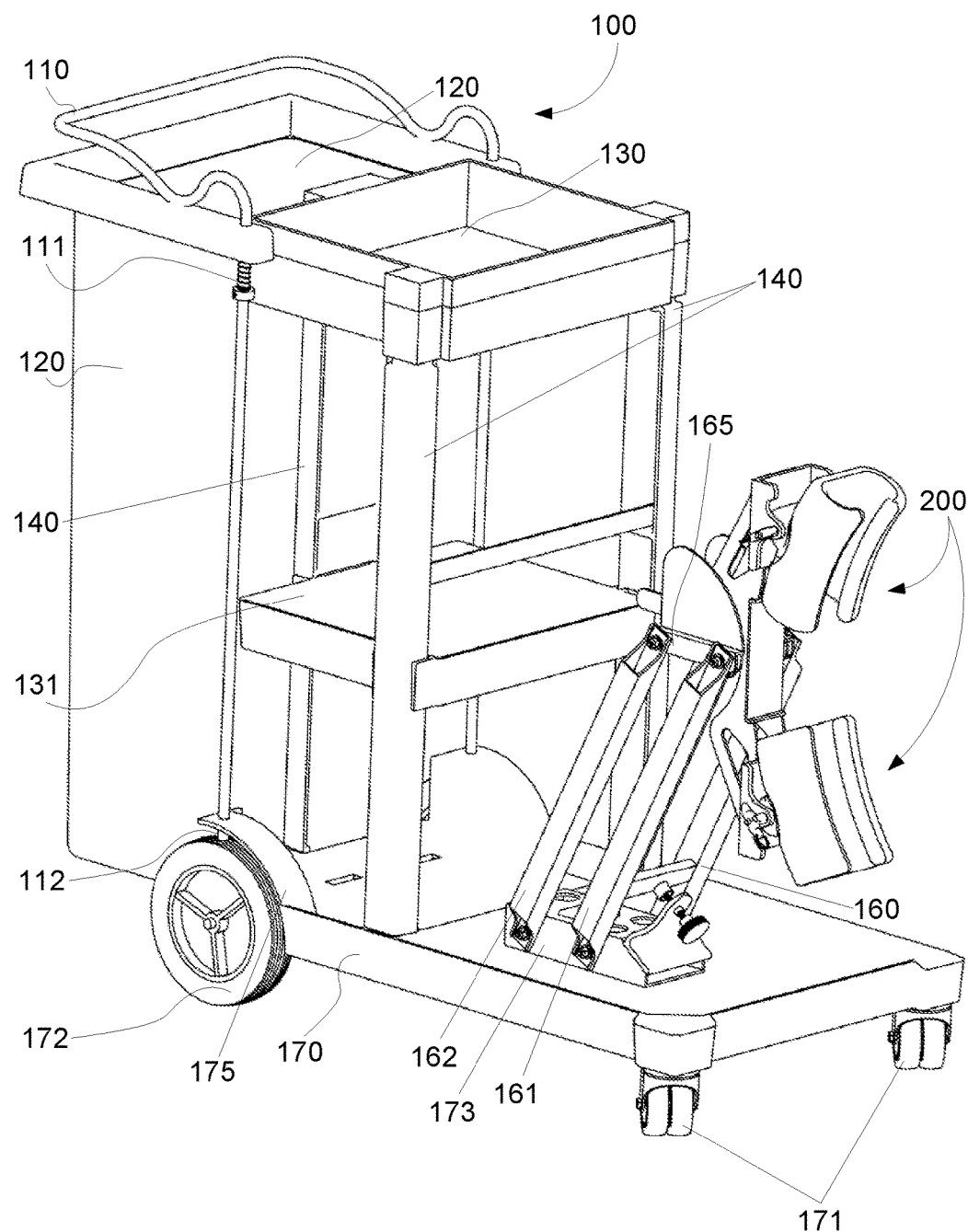
FIG. 1 is an isometric view of one embodiment of a system for cleaning escalator handrails in the extended or operating position.

FIG. 1 is an isometric view of one embodiment of a system for cleaning escalator handrails in the operating postion. The system is comprised essentially of a cart arrangement 100 and a cleaning pad arrangement 200.

In some embodiments, cart 100 may include a handle 110. Handle 110 may be multipurpose. First, handle 110 may be used to push or pull cart 100 into a proper position. Second, handle 110 may be used to engage or disengage spring 111, which in turn engages or disengages handle brake 112. In some embodiments, brake 112 normally engages wheel 172, and handle 110 must be manipulated in order to disengage brake 112. For instance, in some embodiments, handle 110 is depressed, which causes spring 111 to lift brake 112, disengaging wheel 172. When handle 110 is released, spring 111 is released and brake 112 engages rear wheel 172, preventing motion of the cart. In other embodiments, handle 110 must be lifted in order to disengage brake 112. When handle 110 is released, brake 112 engages rear wheel 172, preventing motion of the cart.

In other embodiments, brake 112 is normally disengaged, and handle 110 must be manipulated in order to brake wheel 172. For instance, handle 110 may be lifted into a locked position, causing spring 111 to depress brake 112 and engage wheel 172. In another embodiment, handle 110 may be depressed into a locked position, causing spring 111 to shift brake 112 and engage rear wheel 172. Spring 111 may be a compression spring, a clock spring, a torsion spring, a tension spring, or any other type of tension device without altering the function of the spring. Likewise, handle 100 may be metallic, plastic, wood, may be curved, straight, or any other shape or material without altering the function of the handle.

In some embodiments, cart 100 may include a receptacle 120. Receptacle 120 may be used for refuse, or to store or transport other elements of the present invention. Receptacle 120 may have an opening at the top of the cart, may contain a lid (not depicted), may be removable or replaceable, and may be comprised of a rigid or flexible material as the application calls for.

In some embodiments, cart 100 may also include at least one tray 130. In a preferred embodiment, tray 130 may be used to store the cleaning solution used with the present invention. In another preferred embodiment, tray 130 may be used to store or transport additional cleaning pads or elements of the present invention. Tray 130 may be comprised of any rigid or semi-rigid material. In some embodiments, tray 130 may be comprised of a material that has particular characteristics, such as non-reactivity with the recommended cleaning solution, rust resistance, strength or heat characteristics, etc. In some embodiments, tray 130 is supported by beams 140. In some embodiments, beams 140 may be four in number. In other embodiments, beams 140 may be three in number as depicted in FIG. 1. In some embodiments, cart 100 may include a second tray 131. Tray 131 may serve any of the purposes of tray 130.

In some embodiments, cart 100 may include a base 170. Base 170 is the support structure for cart 100, and as such can be any rigid material without impacting the function of the base. In some embodiments, base 170 may include front wheels 171. Wheels 171 will tend to be smaller than rear wheels 172 to allow for better maneuverability of cart 100, but in some embodiments the front wheels may be substantially the same size as or even larger than rear wheels 172. In some embodiments, wheels 172 may be covered by a portion of base 170, such as a wheel guard 175.

In some embodiments, base 170 may include a bracket 173, with which struts 160 are coupled. Bracket 173 may be fastened onto base 170 in any number of ways so long as the bracket is substantially immobile. Strut 160 may be fastened onto bracket 173 in any number of ways so long as it can rotate about the fastener, as the strut is designed to be moveable. In some embodiments, strut 160 may be a single strut. In some embodiments, strut 160 may be comprised of multiple arms, such as forward arms 161 and rearward arms 162. In some embodiments, strut 160 may be comprised of 1, 2, 3, 4, or more individual arms. In a multiple-arm embodiment, each arm may move in tandem or individually, depending on the need of the particular application. In a preferred embodiment, depicted in FIG. 1, strut 160 is comprised of two forward arms 161 and two rearward arms 162, wherein the lower portions of both sets of arms are mounted to the forward and rearward portions of bracket 173, respectively. The upper portions are coupled with a crossbar 165, which causes the individual arms to move in tandem. Crossbar 165 is further coupled with the mounting bracket, which is better depicted in FIG. 3.

Figure 2:
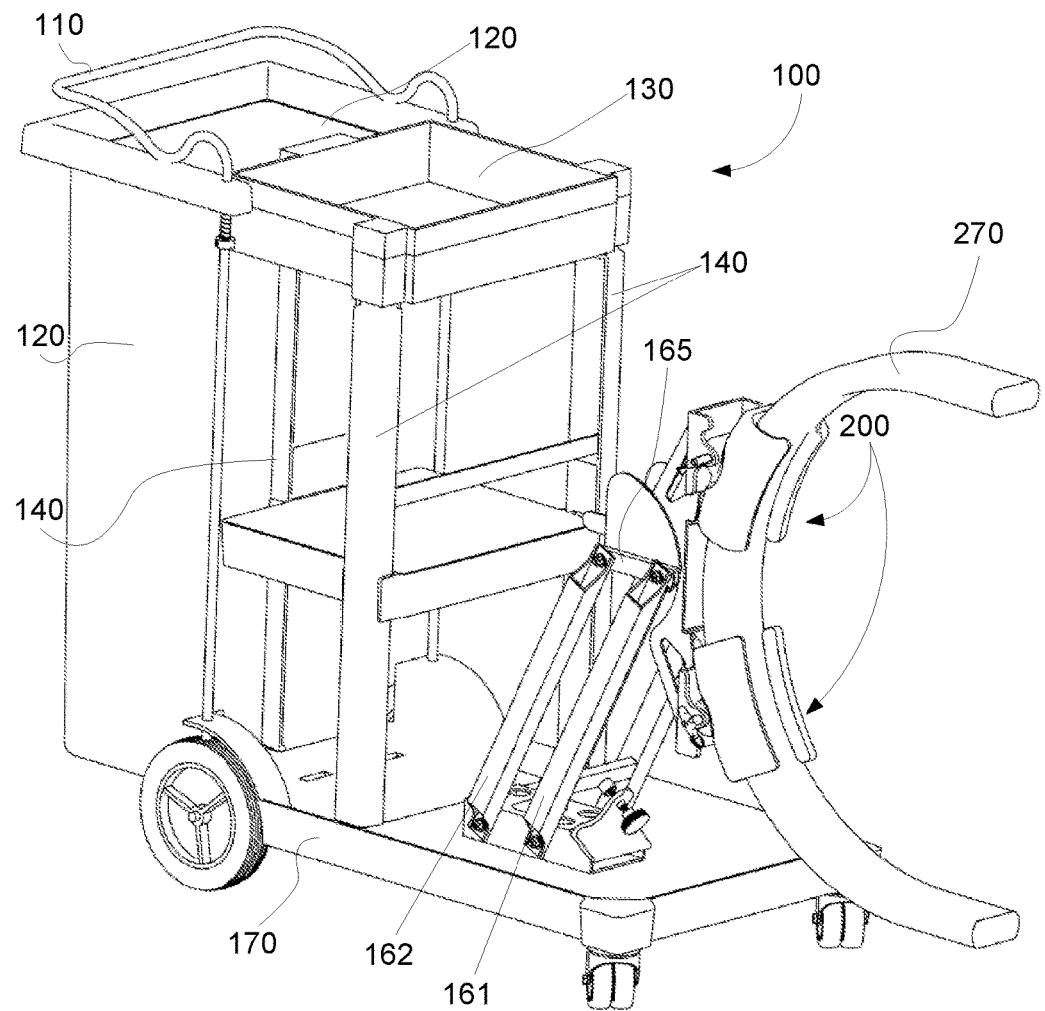
FIG. 2 is an environmental isometric view thereof.

FIG. 2 is an isometric view of one embodiment of the system for cleaning escalator handrails in the operating position and in use. In this embodiment, strut 160 is extended, allowing cleaning elements 200 to be positioned around an escalator handrail 270. The details pertaining to cleaning elements 200 are better disclosed in other figures, which will be discussed further herein.

Figure 3:
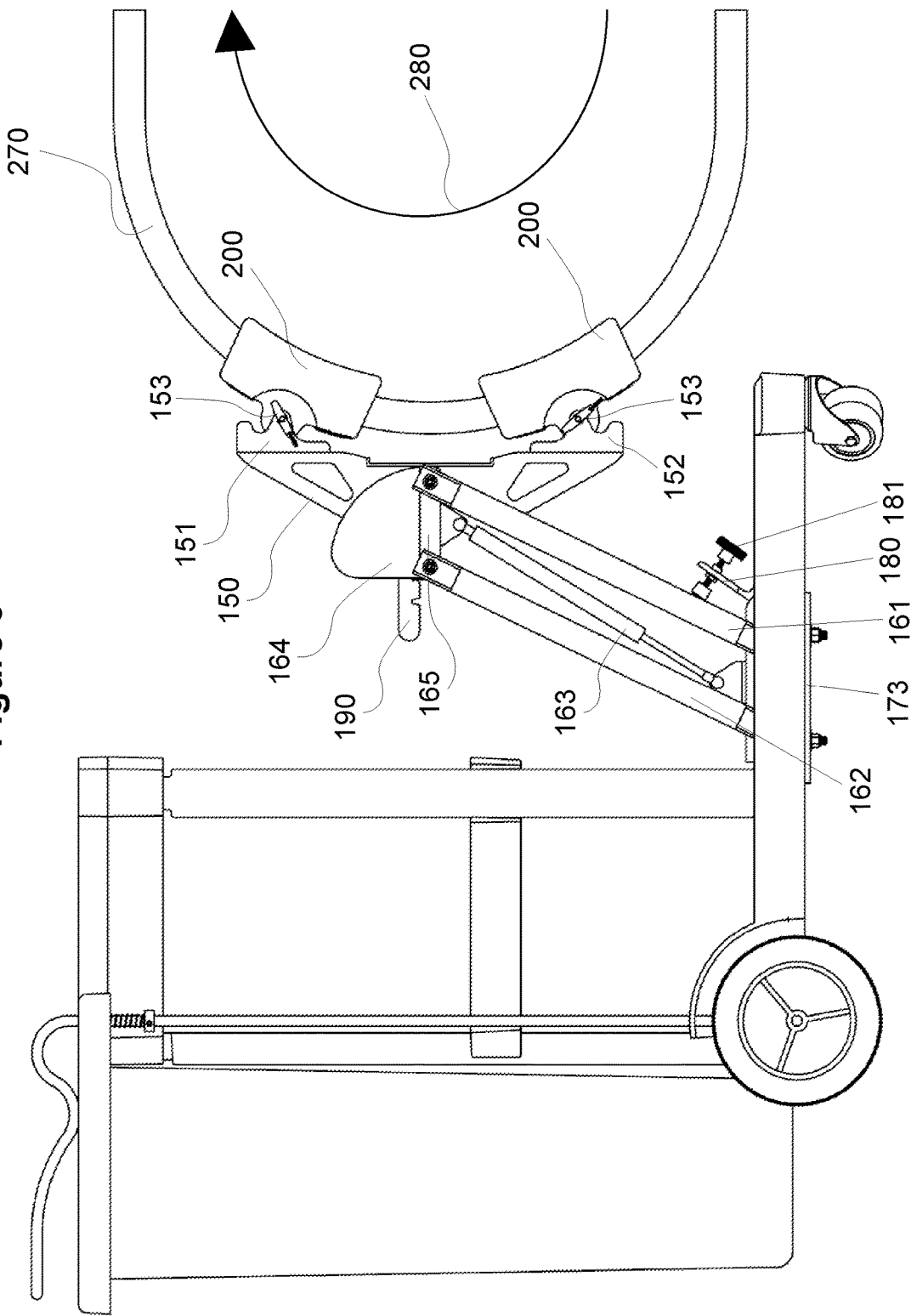
FIG. 3 is an environmental side view thereof.
Figure 4:
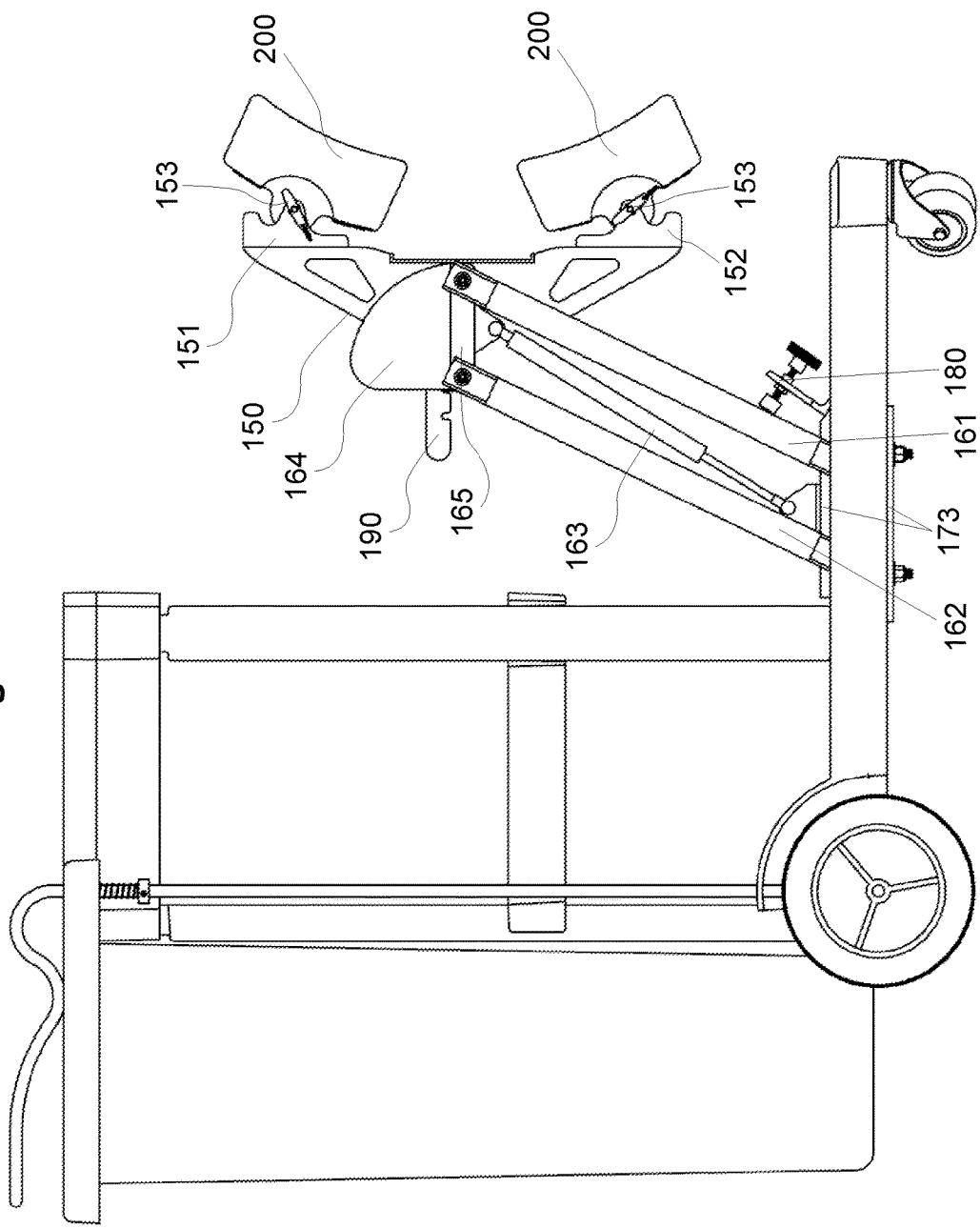
FIG. 4 is a side view of one embodiment thereof.

FIGS. 3 and 4 are side views of one embodiment of the system for cleaning escalator handrails. FIG. 3 shows the system with an escalator handrail. FIG. 4 is the system alone for illustrative purposes. These figures better illustrate the remainder of strut 160 and the integration with mounting bracket 150, otherwise known as the cleaning pad carriage.

In some embodiments, there may be a stopper 180 between the cart base 170 and the strut 160. In some embodiments, stopper 180 may be fixed, providing a constant position for strut 160 when the strut is extended into the operating position. In other embodiments, stopper 180 may be adjustable. In a further embodiment, stopper 180 may be adjusted by turning the knurled knob 181. In a different further embodiment, stopper 180 may be adjusted by loosening the stopper from the attachment to the base 170 and rotating it with respect to the plane of the base.

In some embodiments, strut 160 may further include a positional element 163. A function of positional element 163 is to aid in the positioning and stability of cleaning elements 200. In some embodiments, positional element 163 may be a pneumatic or hydraulic cylinder. In some embodiments, positional element 163 may be a gas spring. In some embodiments, positional element 163 may be any other type of linear spring. The reciprocating linear motion of positional element 163 may be achieved in many manners without altering the function of the element.

Strut 160 is coupled with mounting bracket 150. In some embodiments, the joint between strut 160 and bracket 150 is fixed. In some embodiments, the joint between strut 160 and bracket 150 is movable. In a preferred embodiment, mounting bracket 150 rotates around the joint with strut 160, allowing the mounting bracket and cleaning elements 200 to have a different position relative to strut 160. See FIGS. 6 and 9 for examples. Allowing mobility in the joint between strut 160 and bracket 150 further allows cleaning elements 200 to be positioned more accurately with respect to cart 100 and escalator handrail 270. In some embodiments, the joint between may allow movement in only one direction. In other embodiments, the joint may allow movement in two or more directions. In some embodiments, the joint may be a ball joint, allowing almost 100 percent freedom of motion. In some embodiments, the joint may allow movement in three or more axes.

In some embodiments, mounting bracket 150 may have only one mount. In a preferred embodiment, mounting bracket 150 has two mounts, an upper mount 151 and a lower mount 152. In this configuration, a user is able to clean escalator handrail 270 by passing the handrail through both the upper and lower cleaning elements. In one method of use, a user soaks one cleaning element 200 in a cleaning solution and mounts it on lower mount 152. A dry cleaning element 200 is mounted on upper mount 151, and the cleaning elements are flexed to fit snugly around handrail 270. Handrail 270 is cleaned as it passes first through the wet cleaning element and then through the dry element. Note the direction of travel 280 as depicted in FIG. 3. The particular direction of travel is recommended because it allows the handrail to dry more completely as it runs the length of the escalator. This is important for at least three reasons. The first is that it prevents dust and other debris from the escalator mechanism, such as rollers and guides, from collecting on the handrail. Moreover, a wet handrail entering the system may cause disruptions in the guidance and tracking of the drive system, causing damage to the handrail and escalator as a whole. Furthermore, placing the handrail cleaner at the newel (emerging) end of the escalator helps to prevent a situation in which any part of the handrail cleaner is caught on the handrail and is entrapped by the handrail system. Since the handrail is emerging, any element that becomes caught on the handrail can be pulled off before entering the system, eliminating the damage and safety risks involved in items becoming entrapped in the handrail system.

In another method of use, a dry cleaning element 200 is mounted on upper mount 151, and a polish or conditioner could be placed on the cleaning element that is mounted on lower mount 152. In another method of use, the cleaning solution may include a polish or conditioner, and the dry element may act as a dryer and buffer. There are many methods of use facilitated by having two cleaning elements positioned one over the other which allow for automated and nearly autonomous cleaning of escalator handrails.

In some embodiments, cleaning elements 200 are coupled with mounts 151 and 152 via fasteners 153. In some embodiments, fasteners 153 are permanent. In preferred embodiments, fasteners 153 are removable to allow for easy installation and removal of cleaning elements 200. In some embodiments, fasteners 153 may be quick release fasteners, such as push-button pins, quarter-turn fasteners, tension latches, push turn fasteners, or any other easily removed standard fastener.

Figure 5:
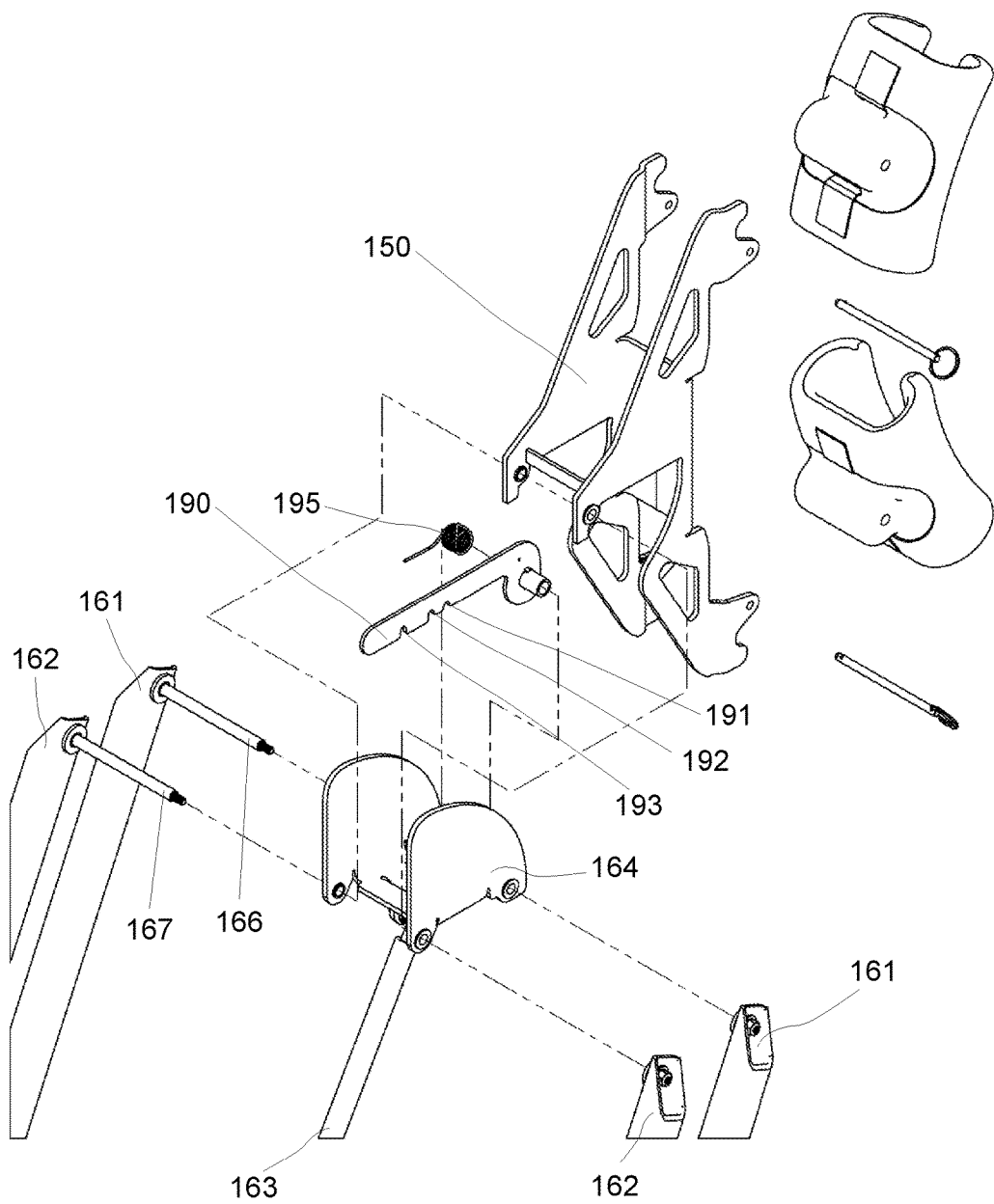
FIG. 5 is an exploded view of a portion thereof.

FIG. 5 is an exploded view of one embodiment of the joint between strut 160 and mounting bracket 150. Here it's possible to see the embodiment wherein strut 160 has a forward arm set 161 and a rearward arm set 162. Positional element 163 can be seen, disposed between the sets of arms that comprise the strut 160. In one embodiment, forward arms 161 may be joined by fastener 166. In some embodiments, rearward arms 161 may be joined by a fastener 167. In some embodiments, fastener 166 or fastener 167 may be further disposed through mounting bracket 150. In this embodiment, mounting bracket 150 may rotate about the fastener 166 or 167 to allow alternative positioning of the bracket. In some embodiments, the right and left arm sets may be joined through a center bracket 164. The center bracket 164 may house latch 190. In some embodiments, latch 190 may have a first notch 191, a second notch 192, and a third notch 193. This particular feature and alternative positioning are discussed in more depth with FIG. 7.

Figure 6:
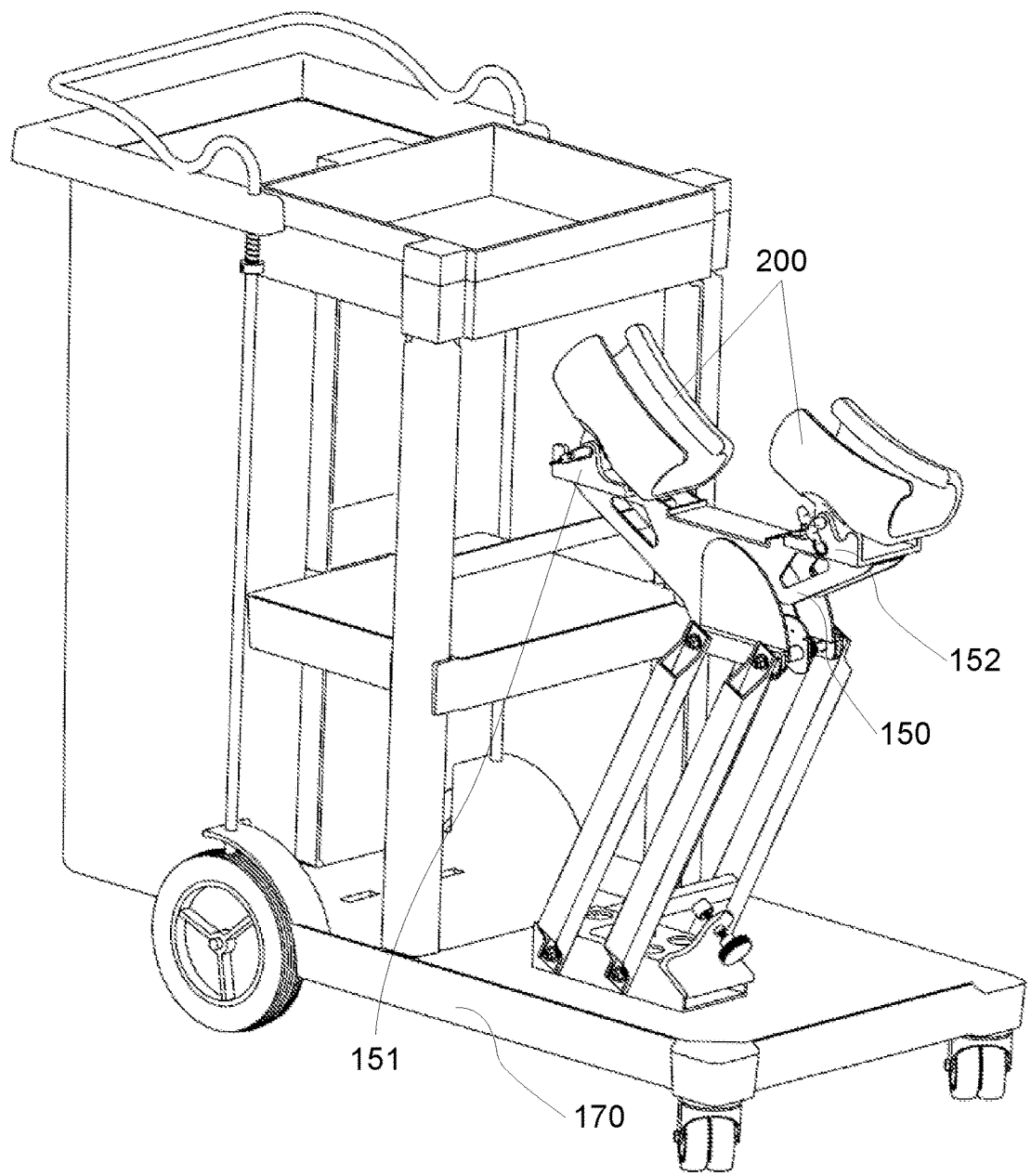
FIG. 6 is an isometric view of one embodiment of a system for cleaning escalator handrails in the maintenance position.

FIG. 6 is an isometric view of one embodiment of the system for cleaning escalator handrails wherein the system is in the cleaning element change position. As can be seen, bracket 150 can be rotated such that mounts 151 and 152 are substantially parallel to the base 170. This allows a user to change the cleaning elements 200, or portions thereof, more easily.

Figure 7:
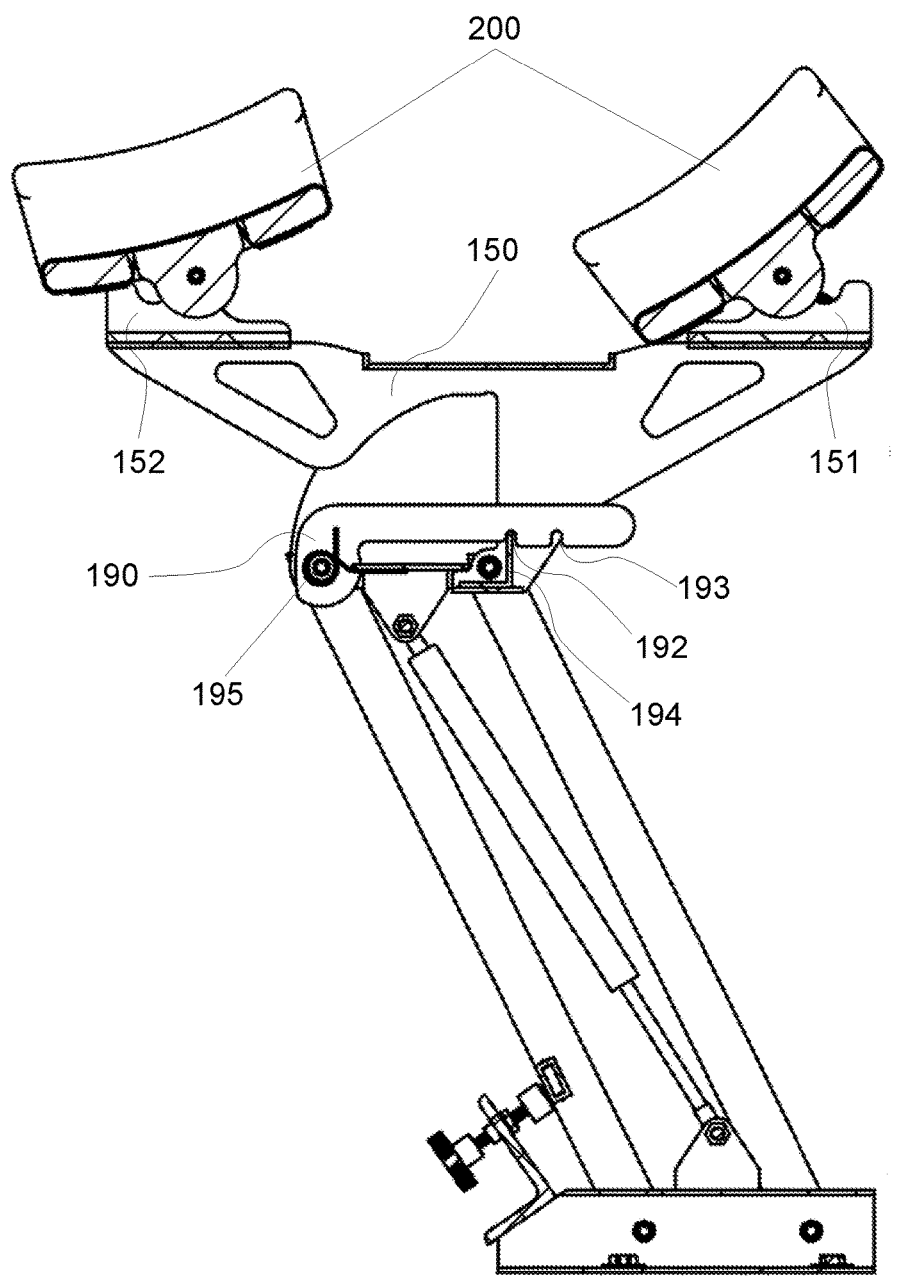
FIG. 7 is a close up view of a portion of one embodiment of a system for cleaning escalator handrails in the maintenance position.

The sectional view of this position shown in FIG. 7 is instructional. Note that the image is rotated such that the front of cart 100 is to the left. FIG. 7 shows that, in some embodiments, bracket 150 can be rotated to present cleaning elements 200 for easy and rapid change. When bracket 150 is rotated, its plane is substantially horizontal, or substantially parallel to the plane of base 170 (not depicted in this figure), which allows easy access to cleaning elements 200.

In some embodiments, mounting bracket 150 is coupled with a latch 190. One method of use is that, when bracket 150 is in an alternative position, latch 190 is engaged to prevent the bracket from returning to its in-use position. In another embodiment, latch 190 is used to hold bracket 150 in any position, including the in-use position, for additional structural integrity. In another embodiment, latch 190 may be used to release bracket 190 from the in-use position to allow movement to an alternative position. In some embodiments, latch 190 may have a first notch 191. When bracket 150 is rotated into the changing position, notch 191 may engage catch 194, holding the bracket in that position. In other embodiments, latch 190 may have a first notch 191 and a second notch 192. When bracket 150 is in the in-use position, notch 192 may engage catch 194, holding the bracket in the cleaning, or in-use, position. When bracket 150 is rotated into the changing position, notch 191 may engage catch 194, holding the bracket in the changing position. In some embodiments, latch 190 may have a first notch 191, a second notch 192, and a third notch 193, each notch allowing a different position of mounting bracket 150. In some embodiments, latch 190 may include a spring 195. Spring 195 may be used to establish a "standard" position for bracket 150, allowing the bracket to return to that position when the latch is disengaged from catch 194. In some embodiments, spring 195 may simply provide a counter force to the force exerted by bracket 150 on the rest of the system when the bracket is in any position. As depicted in FIG. 7, spring 195 is a torsion spring. However, spring 195 may be a compression spring, a clock spring, a tension spring, or any other type of spring without altering its function.

Figure 8:
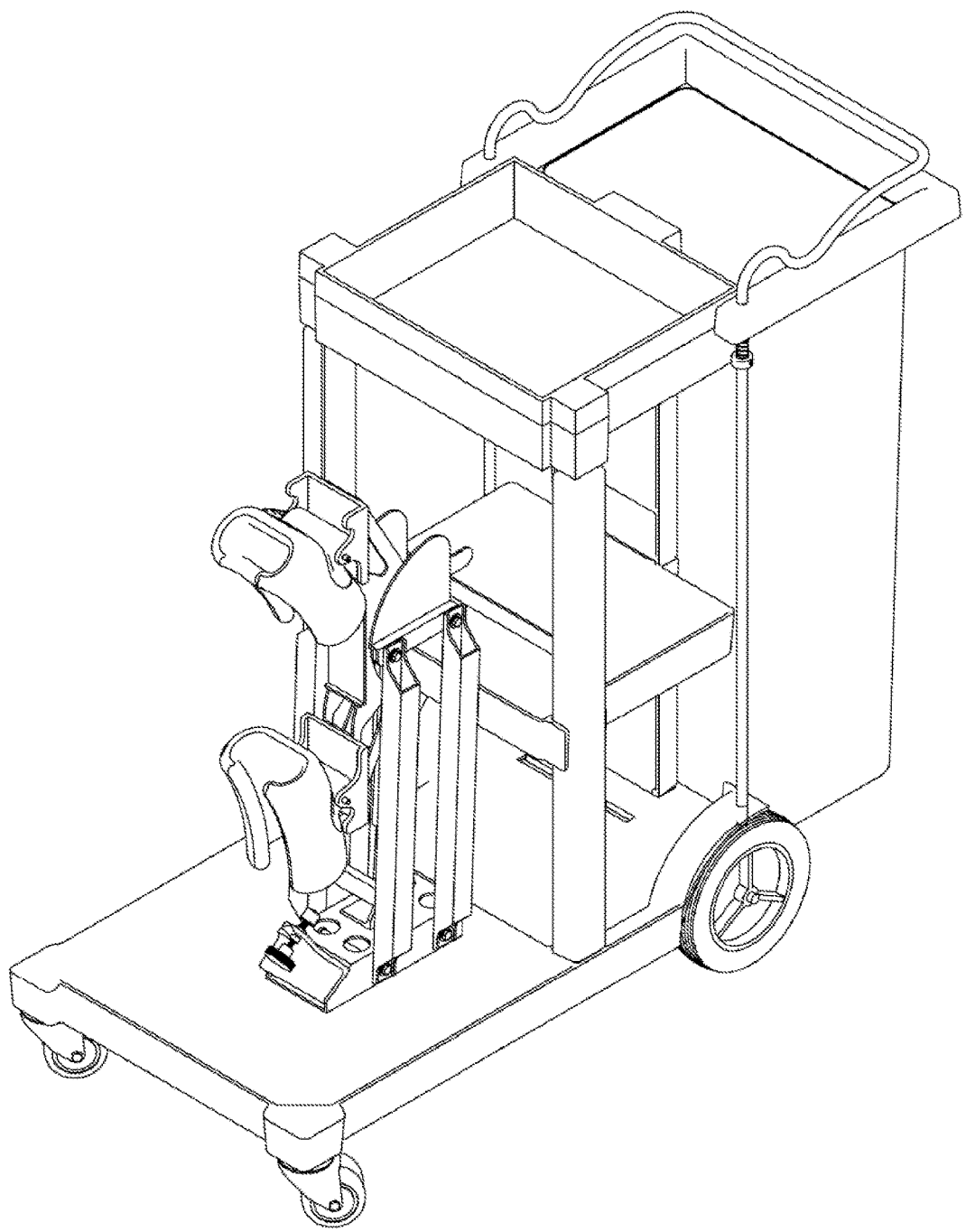
FIG. 8 is an isometric view of one embodiment of a system for cleaning escalator handrails in the storage position.
Figure 9:
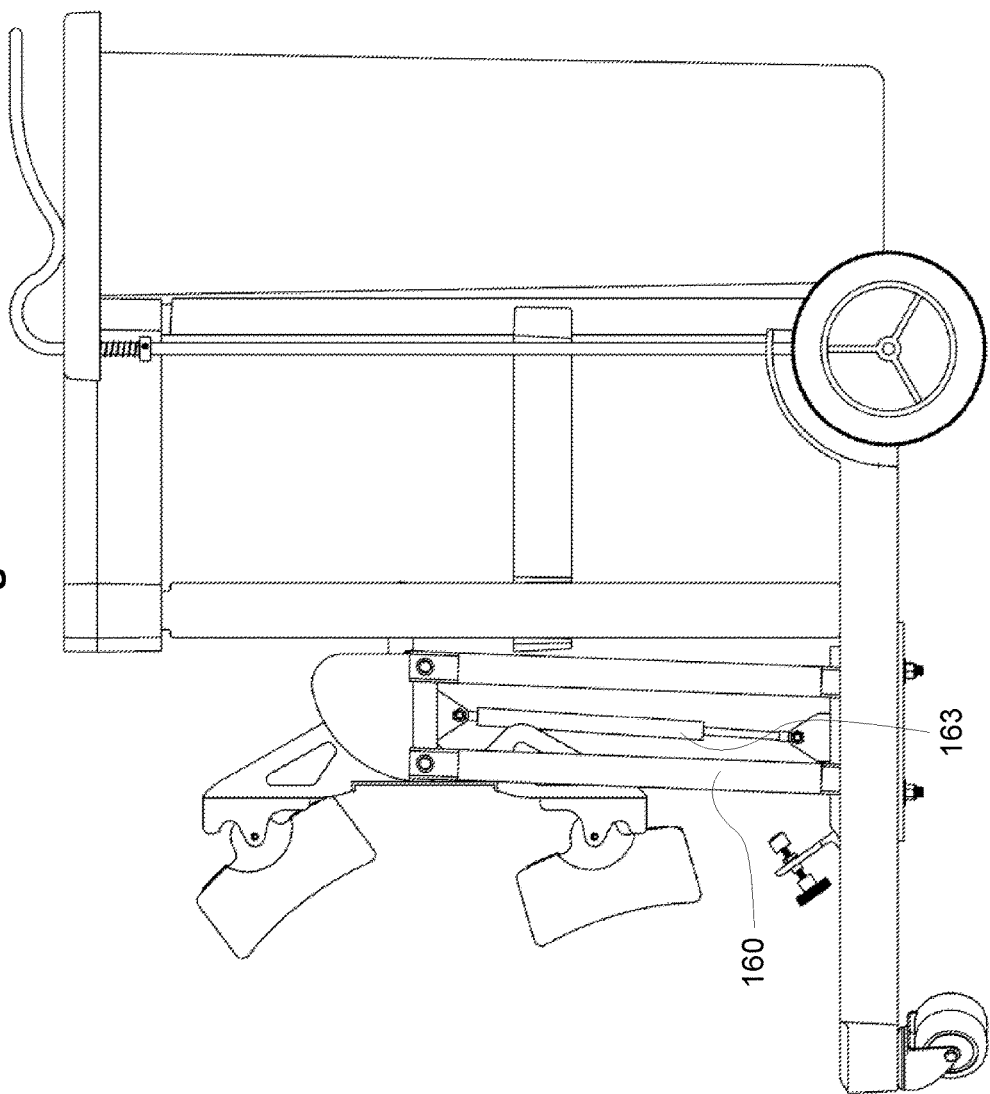
FIG. 9 is a side view thereof.

FIG. 8 is an isometric view of one embodiment of the system for cleaning escalator handrails in the storage position. FIG. 9 is a side view thereof. In this position, strut 160 is retracted so that it is substantially vertical, as opposed to when the system is in the operating position, wherein the strut is at a nearly 45 degree angle to vertical. In some embodiments, cart 100 may include a latch to maintain the storage position. In other embodiments, the storage position may be maintained by the linear spring 163, or by some combination of the linear spring and a separate locking mechanism.

Figure 10:
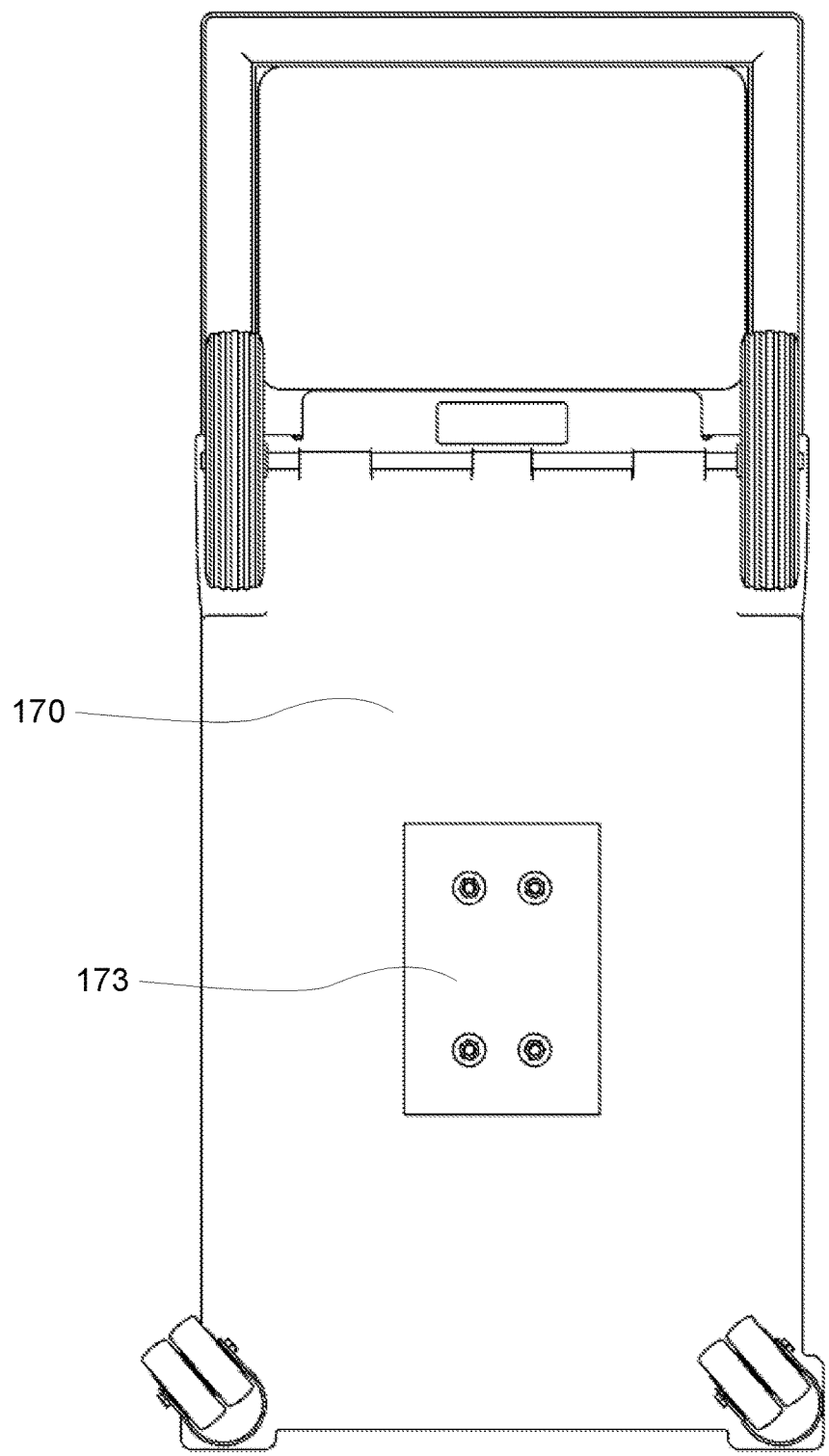
FIG. 10 is a view of the underside of one embodiment of a system for cleaning escalator handrails.

FIG. 10 is a bottom view of one embodiment of the system for cleaning escalator handrails. Bracket 173, to which the strut (not depicted) is fastened, is disposed through the surface of base 170. In some embodiments, the fasteners coupling bracket 173 to base 170 may be permanent, such as, for example, rivets. In other embodiments, the fasteners may be removable, such as nuts and bolts. It may be of value in particular applications to allow the entire strut to be replaced, or to move the strut assembly from a base that has been damaged to one that is intact. Therefore, any number of fasteners can be used in this position without altering the function of the base 170 and bracket 173.

Figure 11:
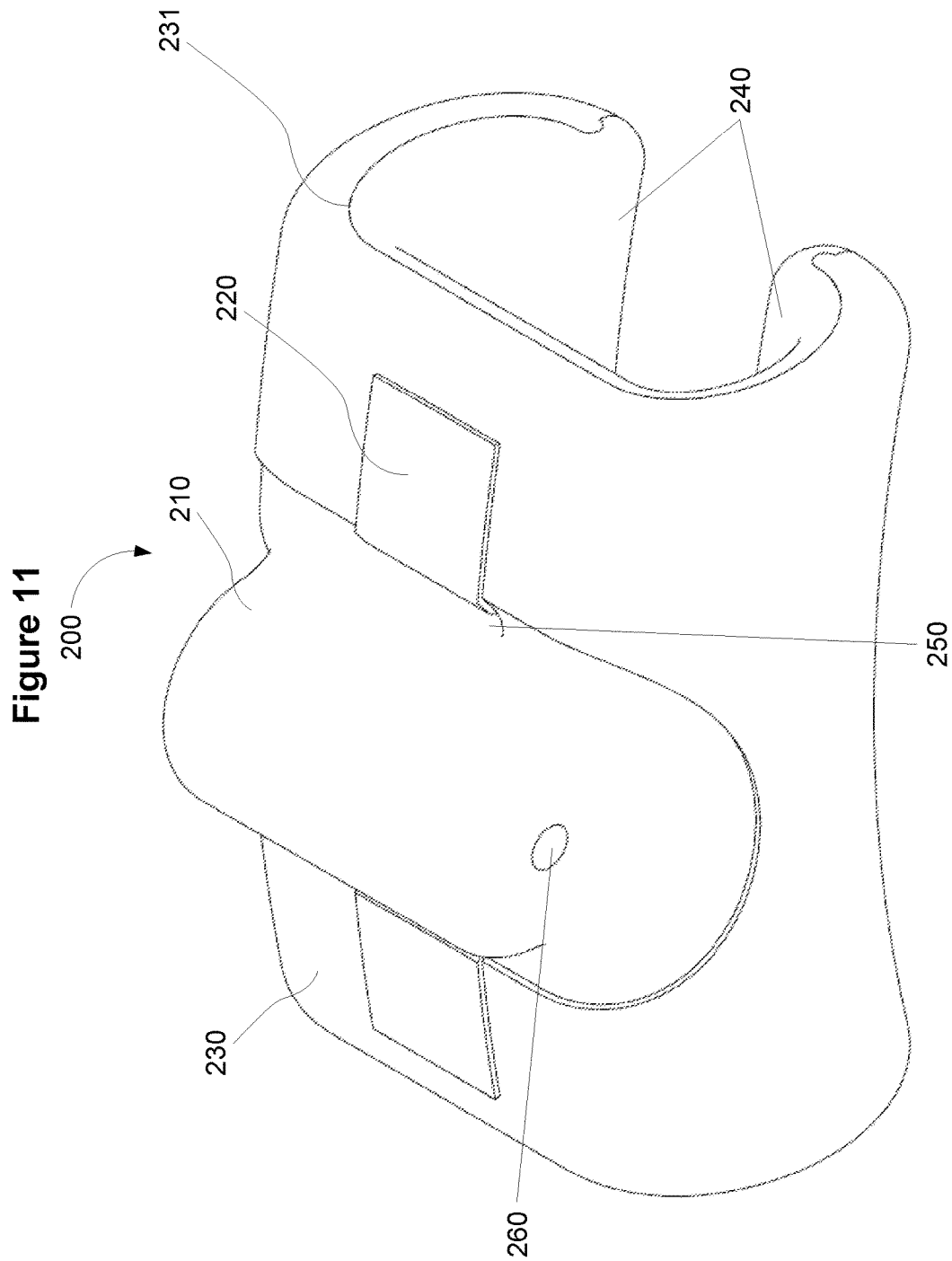
FIG. 11 is an isometric view of one embodiment of a cleaning element for a system for cleaning escalator handrails.

FIG. 11 is an isometric view of one embodiment of cleaning element 200. Cleaning element 200 is comprised of a substantially flexible form 210. In some embodiments, the flexible form 210 may be any flexible material, such plastics, foam, or any number of composites. In other embodiments, the flexible form 210 may be comprised of a non-reactive or substantially inert material, such as silicone, silicone rubber, Teflon, and others. A primary function of flexible form 210 is to provide the specific shape of the cleaning element 200, allowing the element to substantially conform to and almost completely cover the surface and sides of the handrail, while still being flexible enough to be placed onto or removed from the handrail without damaging either the handrail or the form. However, flexible form 210 will almost certainly come into contact with at least a cleaning solution, many of which contain at least one caustic or chemically abrasive ingredient. Flexible form 210 is also likely to come into contact with polishes, waxes, and the handrail material. As such, the material properties of flexible form 210 may become relevant in a particular application. Therefore, many flexible materials may work without altering either the primary or secondary functions of the flexible form 210, and may be changed as necessary for a particular application.

Cleaning element 200 may also include a cleaning cloth 240. Cloth 240 may be microfiber, cotton, terrycloth, or any number of standard cleaning cloth materials, but a preferred embodiment uses microfiber for its ability to hold moisture as well as collect and hold debris. In this application, cleaning cloth 240 will often be required to both hold a cleaning solution and trap any debris that is dislodged in the cleaning process, an application for which microfiber is particularly well suited.

Cleaning cloth 240 is designed to sit flush against the inner portion of form 210, covering the entire surface. In order to do so, it must be held onto form 210 in some way that does not obstruct the function of cleaning cloth 240. One solution is to use support cloth 230. In some embodiments, support cloth 230 is coupled with cleaning cloth 240 on a seam 231 that approximately follows the edge between the inner and outer portions of form 210. Support cloth 230 and cleaning cloth 240 are stretched over form 210, leaving a spot at the top for the form to protrude and allow access to pinhole 260. In some embodiments, the cloths are held onto form 210 by strap 220, which is disposed through a slit 250 in the top of the flexible form. In other embodiments, support cloth 230 may be elastic enough to maintain its position on form 210 without use of the strap. In other embodiments, strap 220 may connect directly with cleaning cloth 240. In other embodiments, cloths 230 and 240 may be one material that is disposed on form 210 in any of the above methods.

Pinhole 260 is the point at which form 210 would be joined with mounting bracket 150 via pin 153. This is discussed in more detail above.

Figure 12A:
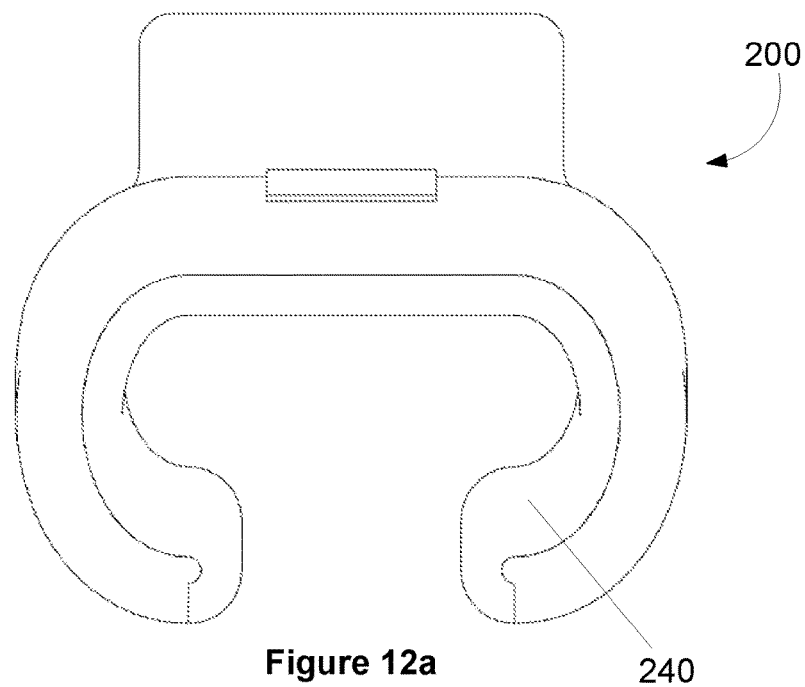
FIG. 12a is a front view thereof.
Figure 12B:
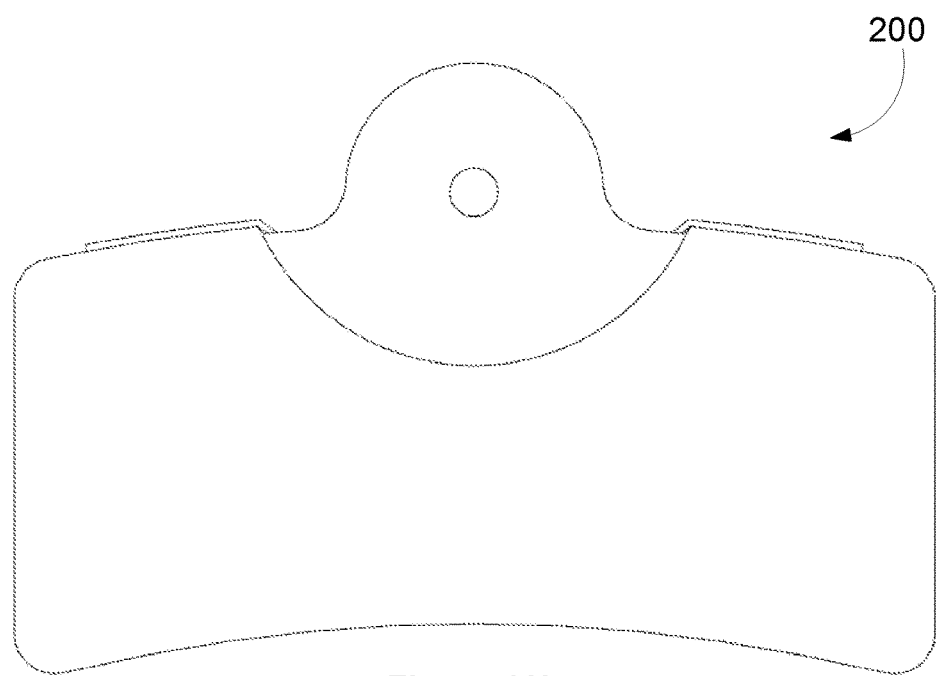
FIG. 12b is a side view thereof.

FIG. 12a is a front view of cleaning element 200. The contour from side to side of cleaning element 200 is designed to cover the top and sides of a handrail, fitting snugly thereon to allow the cleaning cloth 240 to touch all surfaces of the handle that a user might touch. FIG. 12b is a side view, showing the contour of cleaning element 200 from front to back. This is a non-limiting example wherein the embodiment depicted has a slight curve. As seen in FIGS. 2 and 3, the system for cleaning escalator handrails may be disposed at the end of the escalator, where the handrail emerges from the floor and begins to run the length of the escalator. A slightly curved longitudinal profile allows cleaning element 200 to maintain contact with the handrail newel end for slightly longer, giving a better clean and reducing friction points between the handrail and the cleaning element, which ultimately reduces wear on the system. However, in other embodiments, the longitudinal contour is substantially straight, allowing the system to be used on moving walkways or other parts of an escalator where there is no curve in the handrail to be accounted for.

Figure 13:
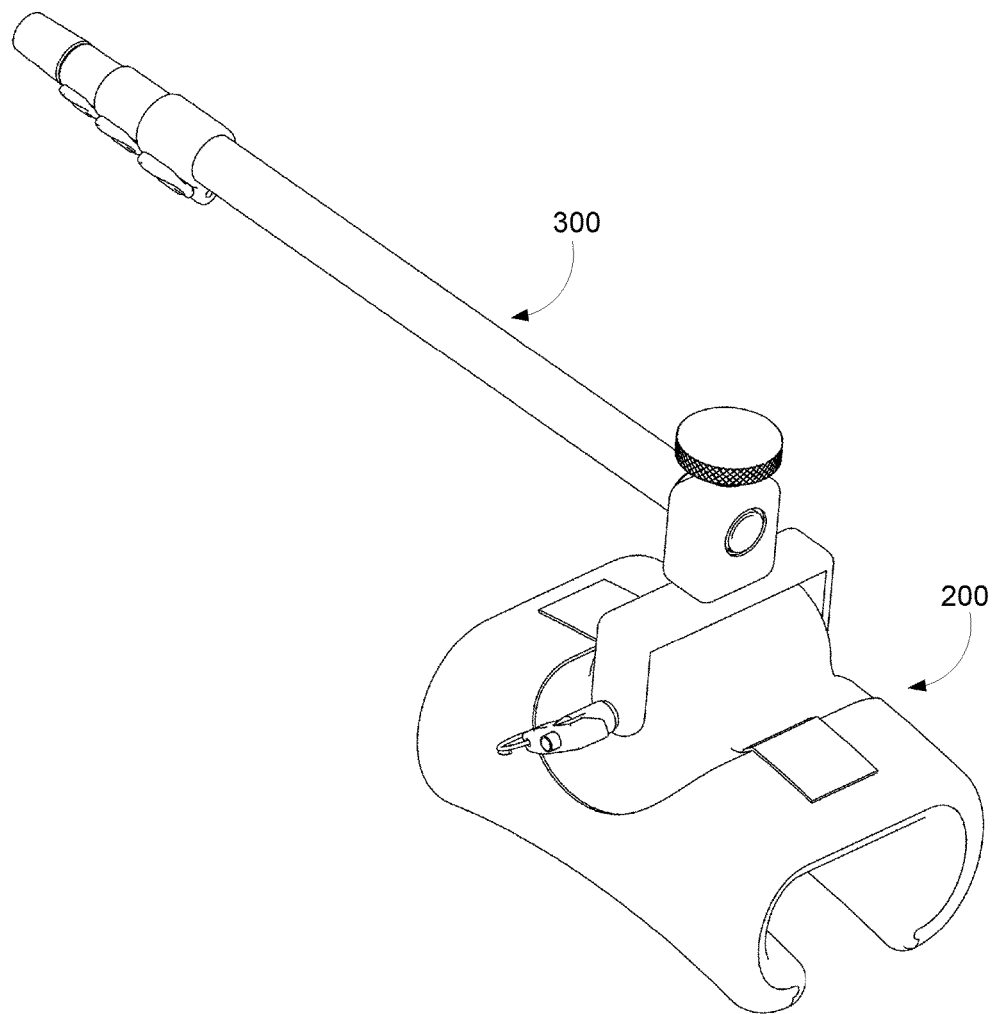
FIG. 13 is an isometric view of one embodiment of a system for cleaning ADA handrails in the retracted position.
Figure 14:
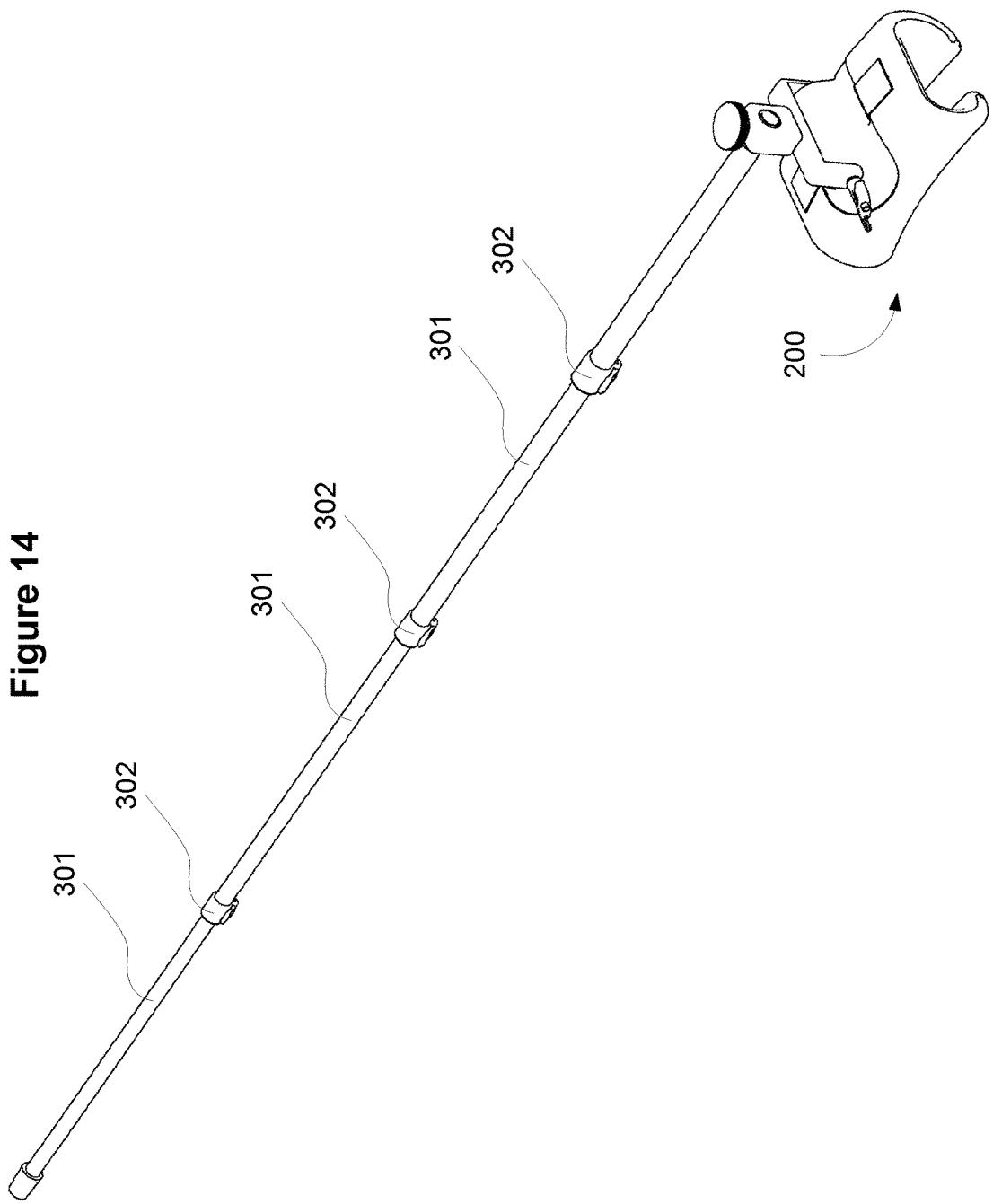
FIG. 14 is an isometric view of one embodiment of a system for cleaning ADA handrails in the extended position.

Americans with Disability Act handrails also require cleaning and conditioning. FIG. 13 is an isometric view of one embodiment of an ADA handrail cleaner. In this embodiment, a cleaning element 200 is attached to a handle element 300. In some embodiments, the handle 300 may be a fixed length. In some embodiments, the handle 300 may be a retractable telescoping handle, as seen in FIG. 14. The telescoping handle 300 embodiment may include one or more sections 301 wherein the sections are progressively slightly smaller such that the majority of the handle can be retracted into the length of a single section. In FIG. 14, this feature can be seen as each section gets smaller in diameter the farther the handle gets from cleaning element 200. This should not be construed as limiting the number of sections in the telescoping handle 300; so long as the number of sections is greater than one, the handle will telescope. When the handle 300 is telescoping, each section may be joined to another with a locking mechanism 302. In some embodiments, locking mechanism 301 may be a clamping lever, a twist lock, or any other telescope locking mechanism. In some embodiments, handle 300 may include a return spring, such that when the locking mechanism 301 is released, the handle portions automatically retract into one another. This telescoping mechanism allows a user to extend cleaning element 200 along the length of the handle without having to stand on the stairs or ramp to do so, making the cleaning process both safer and more ergonomically sound.

Figure 15:
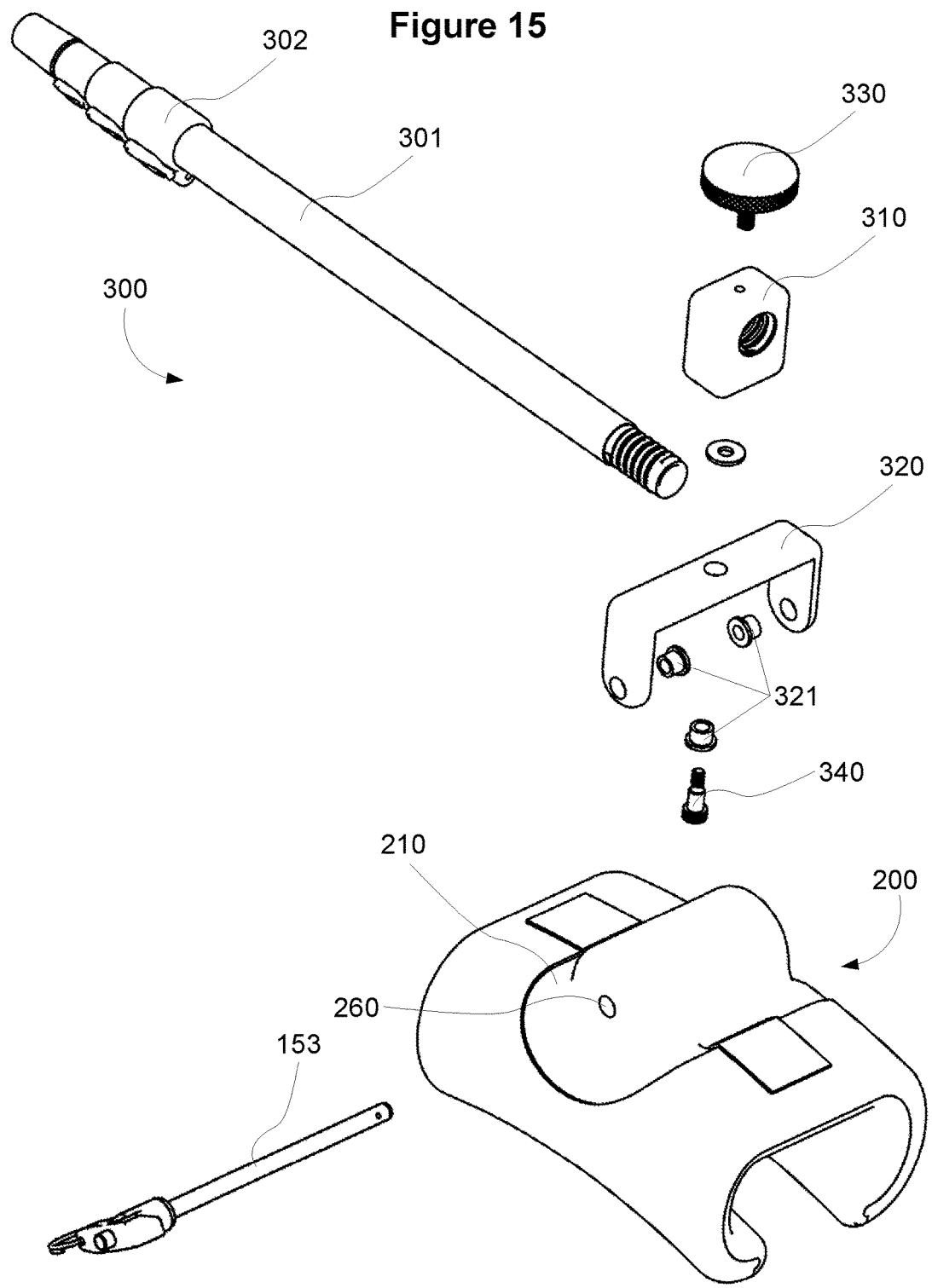
FIG. 15 is an exploded isometric view of a system for cleaning ADA handrails.

FIG. 15 is an exploded view of one embodiment of the ADA handrail cleaner. Handle 300 is coupled with cleaning element 200 by the addition of a socket 310, a bracket 320, a thumb screw 330, and a bolt 340. Bracket 320 is coupled with flexible form 210 via pin 153, which, like with the escalator handrail cleaner embodiment, is disposed through the form in pinhole 260. In some embodiments, bracket 320 may include one or more gaskets 321. In some embodiments, bracket 320 may be rigidly coupled to form 210, such that handle 300 is at a constant angle to cleaning element 200. In other embodiments, bracket 320 may be coupled with form 210 in a manner that allows rotation of handle 300 with respect to cleaning element 200. In one such an embodiment, handle 300 may be movable along the longitudinal plane, such that the handle can go from substantially horizontal to substantially vertical. In another such embodiment, handle 300 may pivot universally, allowing the handle to move in any plane around cleaning element 200. This type of embodiment may be useful for curved stairways or ramps, or in sending the cleaning element 200 around a corner.

Fastener 340 is disposed through a hole in bracket 320, and socket 310 is threaded onto the fastener. In some embodiments, fastener 340 may be a permanent fastener, such as a rivet. In other embodiments, fastener 340 may be removable, such as a bolt. In a further embodiment, fastener 340 may be knurled to allow installation and removal without the use of tools. Once socket 310 is in place, handle 300 is threaded into the socket. Thumb screw 330 is then threaded into a hole in the top of socket 310, and the user can finger-tighten the screw to reinforce the joint of handle 300 to cleaning element 200. In some embodiments, thumb screw may be knurled to facilitate a better grip and more user control.

Figure 16:
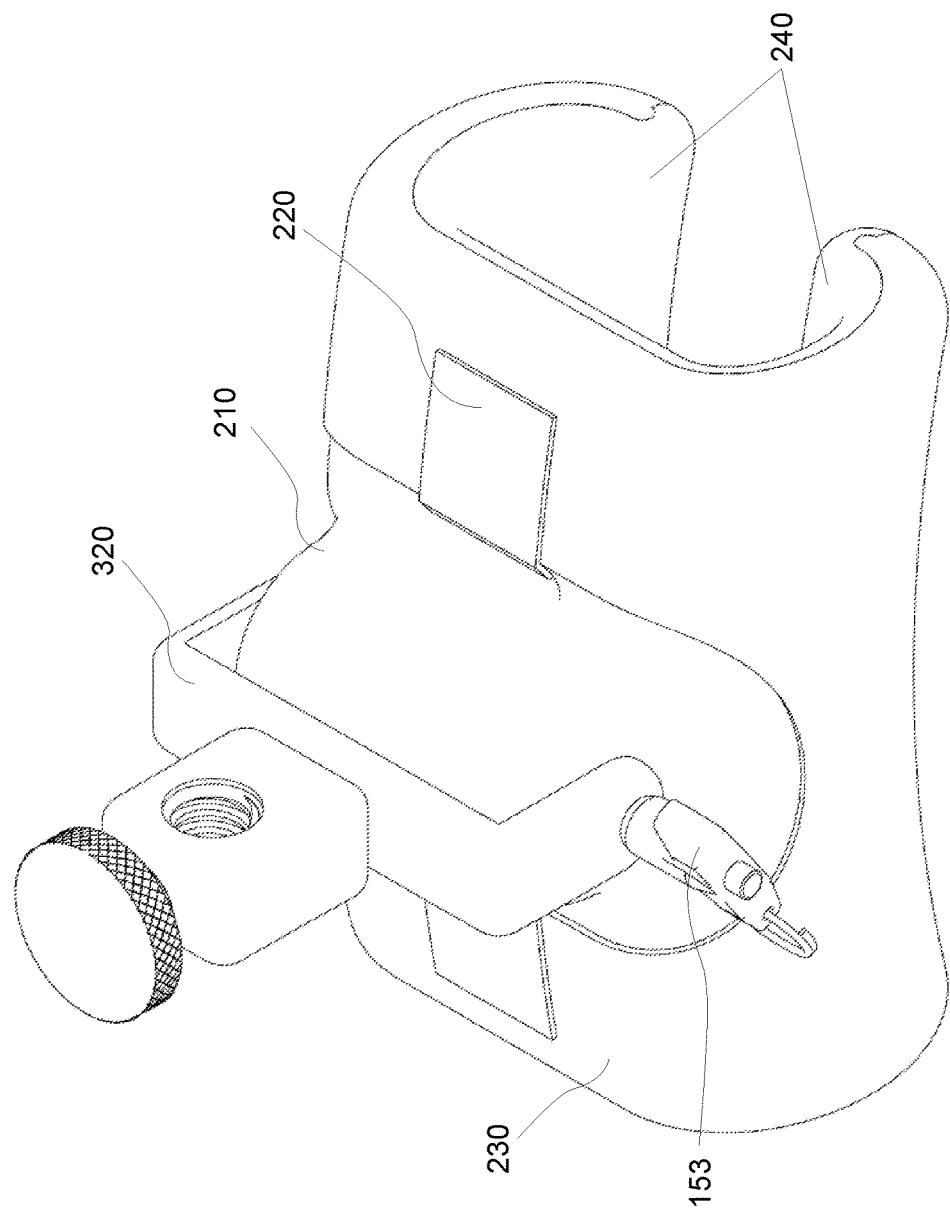
FIG. 16 is an isometric view of one embodiment of a cleaning element arrangement of a system for cleaning ADA handrails.
Figure 17:
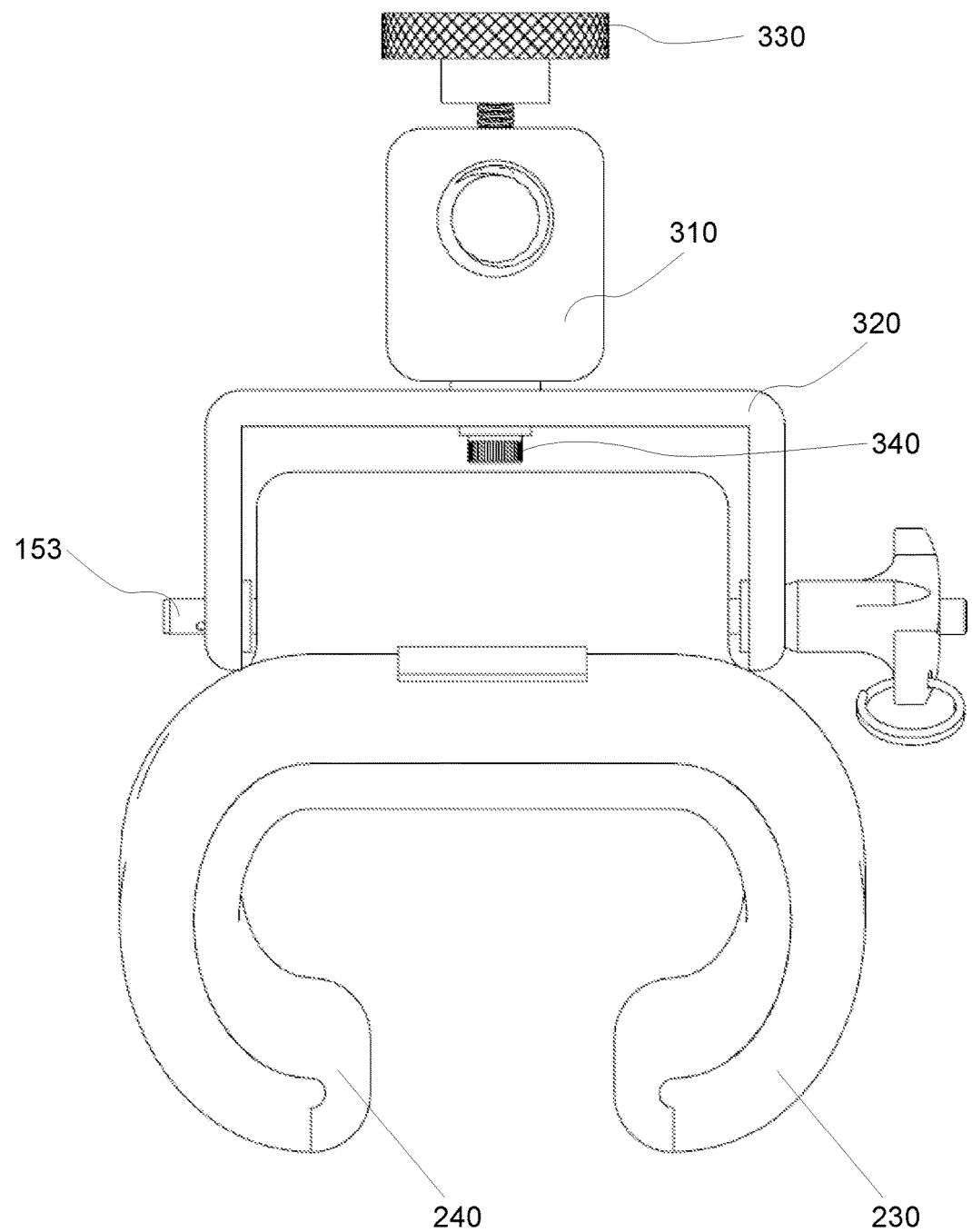
FIG. 17 is a front view thereof.

FIGS. 16, 17, and 18 are detailed views of cleaning element 200 with the modifications for use with handle 300. FIG. 16 is an isometric view, showing the bracket 320 coupled with form 210 by pin 160. It also shows that cleaning element 200 is substantially identical to the cleaning element as used in the escalator handrail cleaning embodiment. Cleaning element 200 has a cleaning cloth 240 coupled with a support cloth 230 and coupled with plastic form 210 by strap 220. While the variations of cleaning element 200 are not repeated here, all of the variations disclosed above still apply. In some embodiments, cleaning element 200 may be a slightly different size in the ADA application than it is in the escalator application, but it performs the same function.

FIG. 17 is a front view of one embodiment of cleaning element 200. This view shows the joint of bracket 320 to socket 310. Socket 310 is coupled with bracket 320 by a fastener 340, which passes through a hole in bracket 320 and into a threaded receiving portion on the bottom of socket 310. Thumb screw 330 allows a user to clamp handle 300 (not shown) into socket 310.

Figure 18A:
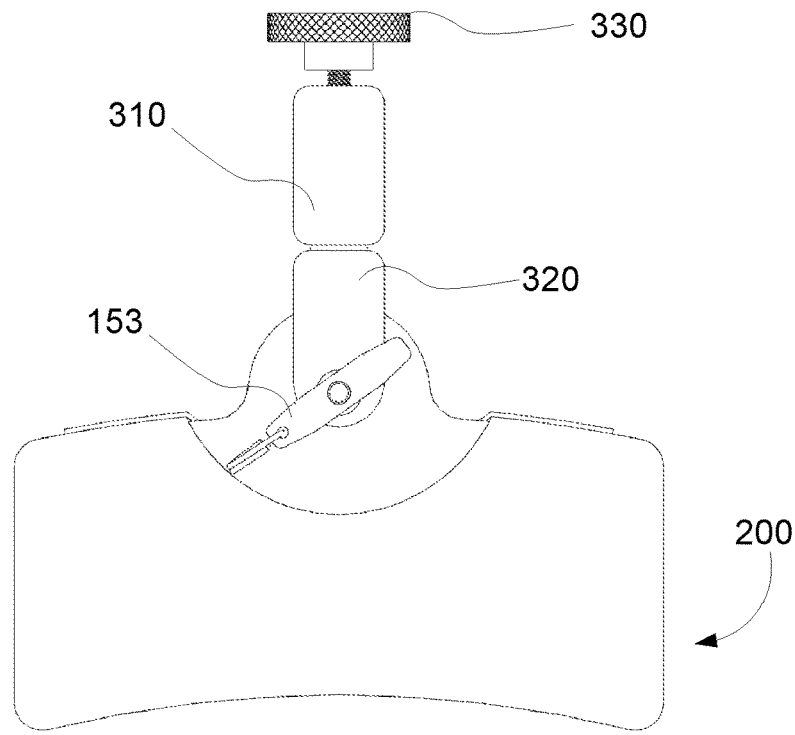
FIG. 18a is a right side view thereof.
Figure 18B:
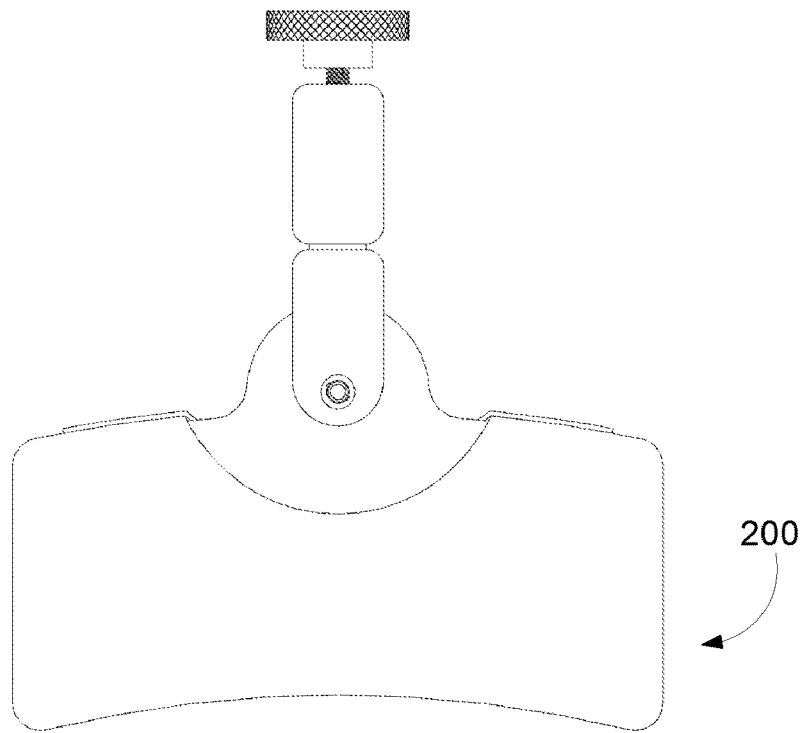
FIG. 18b is a left side view thereof.

FIG. 18a is a right side view of one embodiment of cleaning element 200 with bracket 320, socket 310, and screw 330 installed, wherein the bracket is coupled with the cleaning element 200 by pin 160. FIG. 18b is a left side view thereof.

Figure 19:
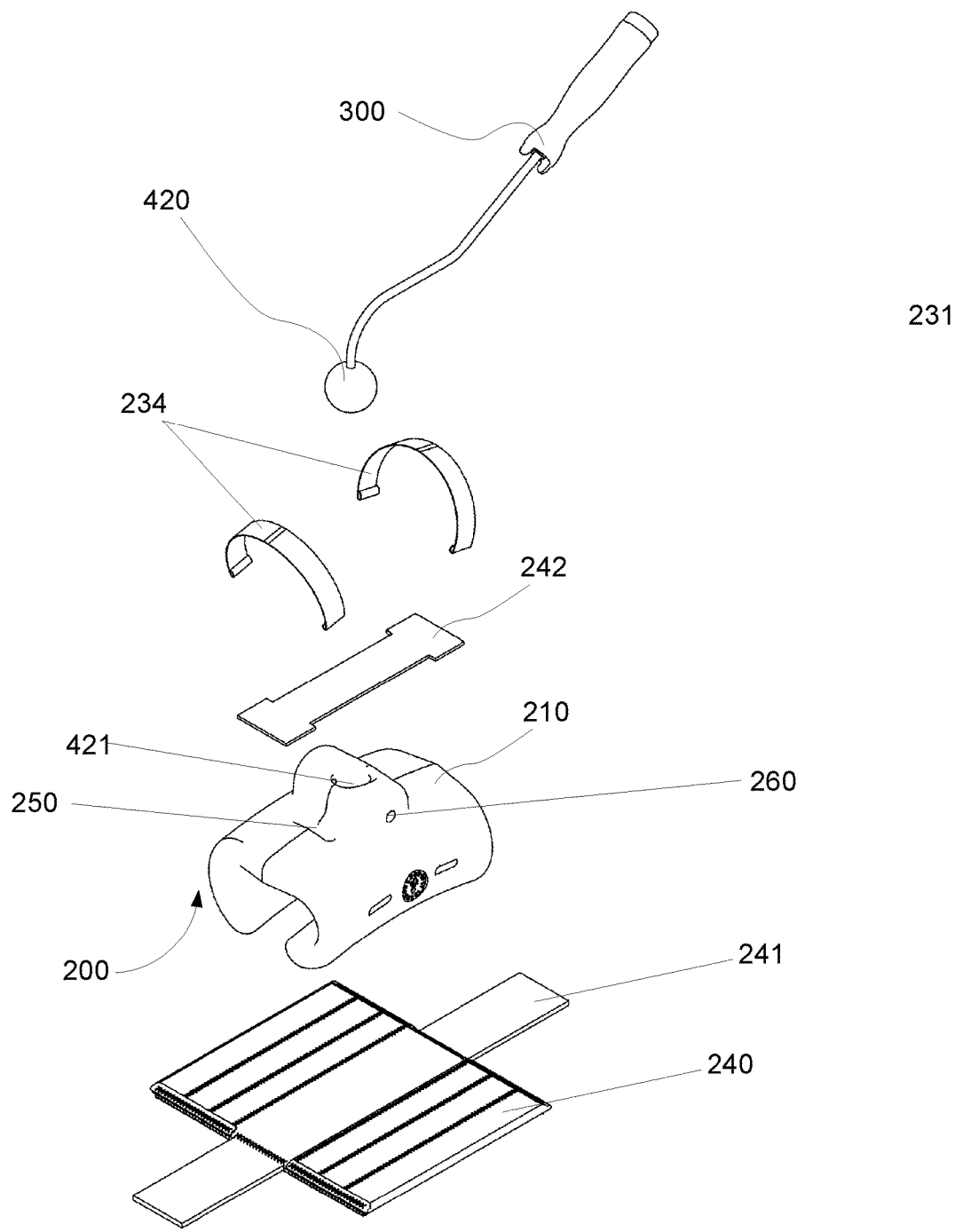
FIG. 19 is an exploded isometric view of another embodiment of the system for cleaning ADA handrails.

FIG. 19 is an exploded isometric view of a different embodiment of the handrail cleaner. In this embodiment, cleaning element 200 is comprised of the substantially flexible form 210 and cleaning cloth 240 as discussed in FIG. 11. In this embodiment, cleaning cloth 240 may include strap 241. Strap 241 may be used to hold pad 240 onto form 210 with the assistance of strap 220 and spring clips 243, wherein strap 220 is disposed through a slit 250 in the top of the flexible form and held in place with clips 243. Strap 241 is then coupled with strap 220, holding the cloth 240 in place, while spring clips 243 hold strap 242 to form 210. This embodiment of cloth 240 is compatible with either the escalator handrail cleaning mechanism or the ADA handrail cleaning mechanism. Pinhole 260 remains accessible for use on the handrail cleaner, and the ball 420 and socket 421 joint permits use as the ADA handrail cleaner. The ball 420 and socket 421 joint also permits a greater degree of mobility between the handle 300 and the cleaner 200, as the ball snaps into the socket, but still rotates freely within.

Figure 20:
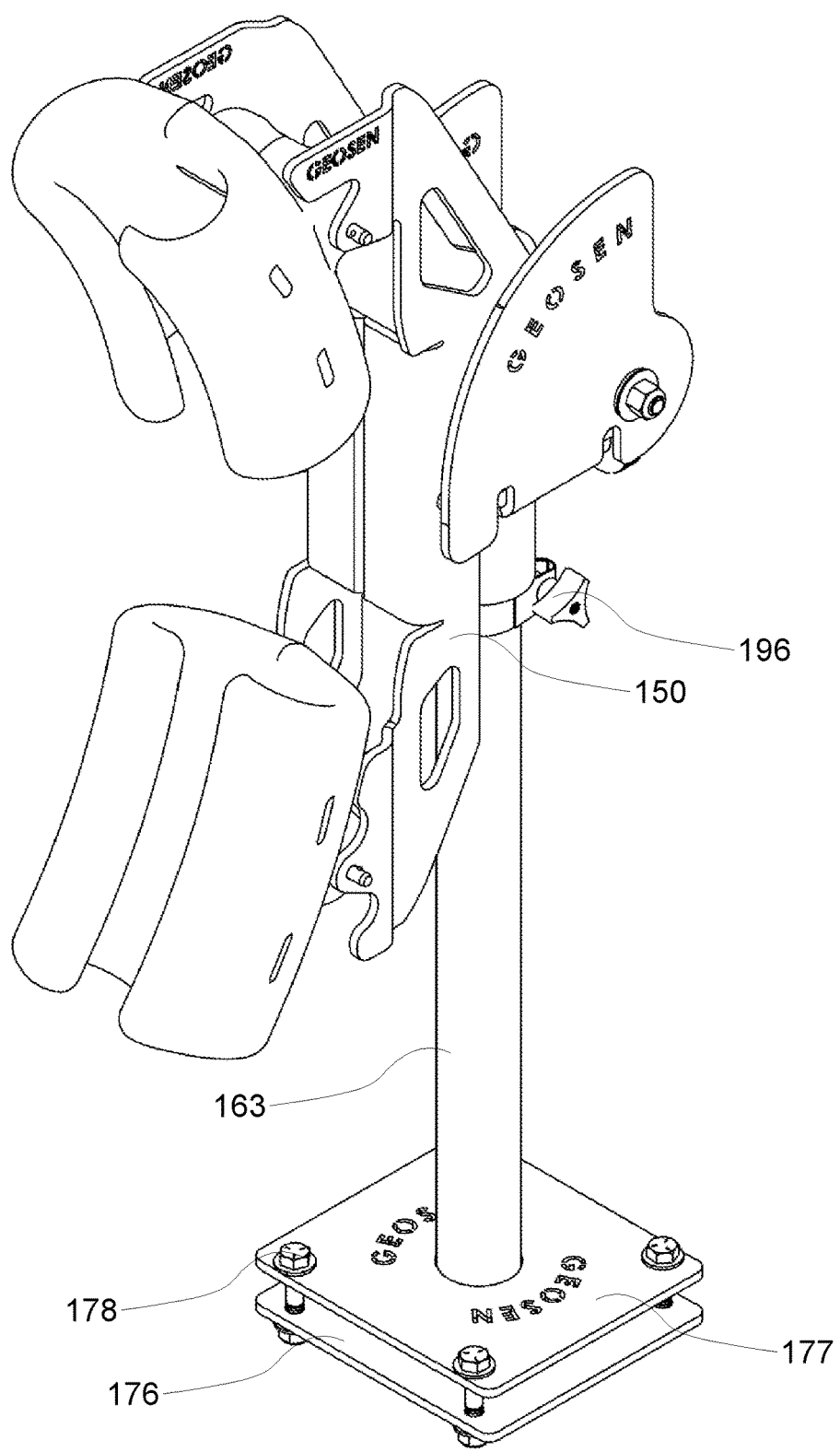
FIG. 20 is an isometric view of another embodiment of the system for cleaning escalator handrails.
Figure 21:
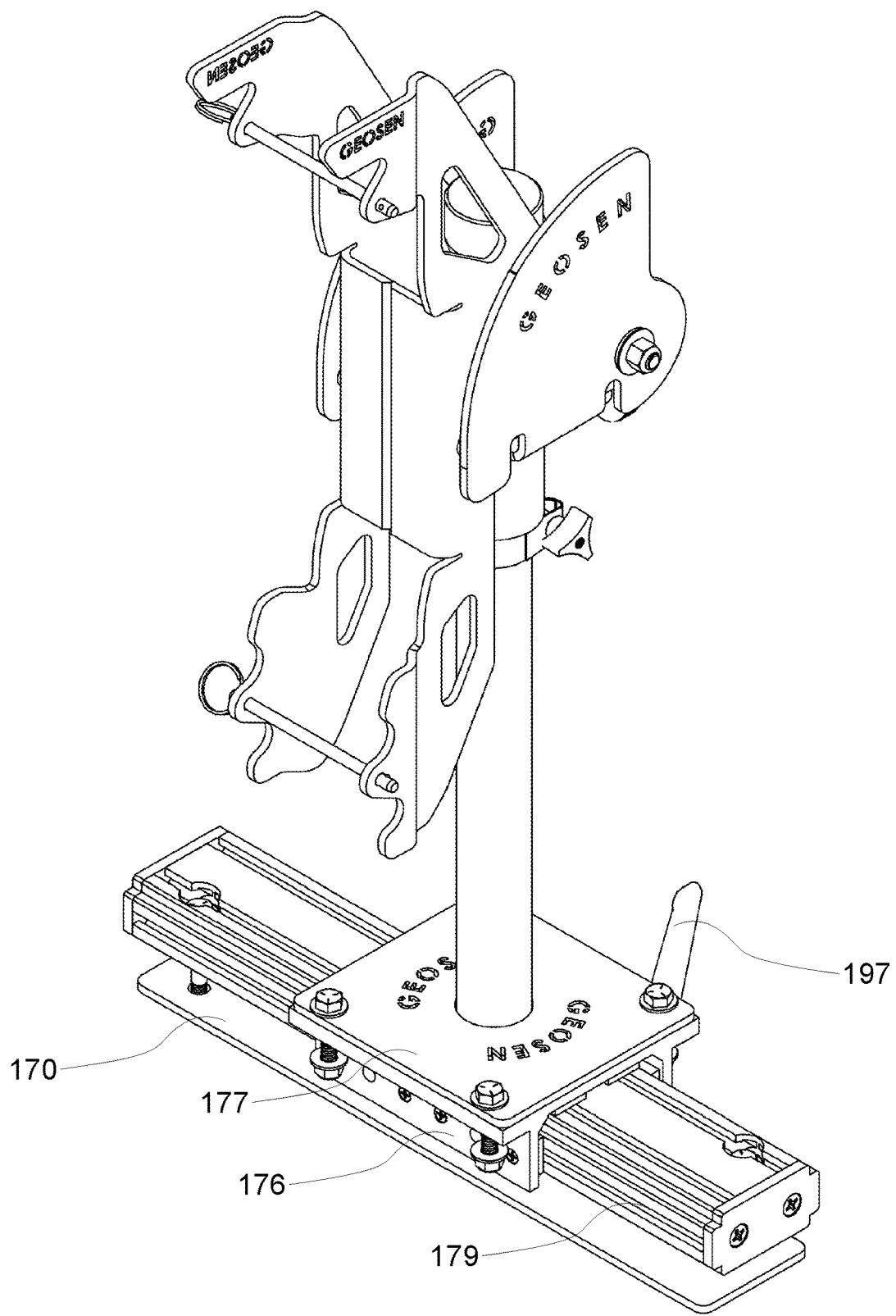
FIG. 21 is an isometric view of another embodiment of the system for cleaning escalator handrails.
Figure 22:
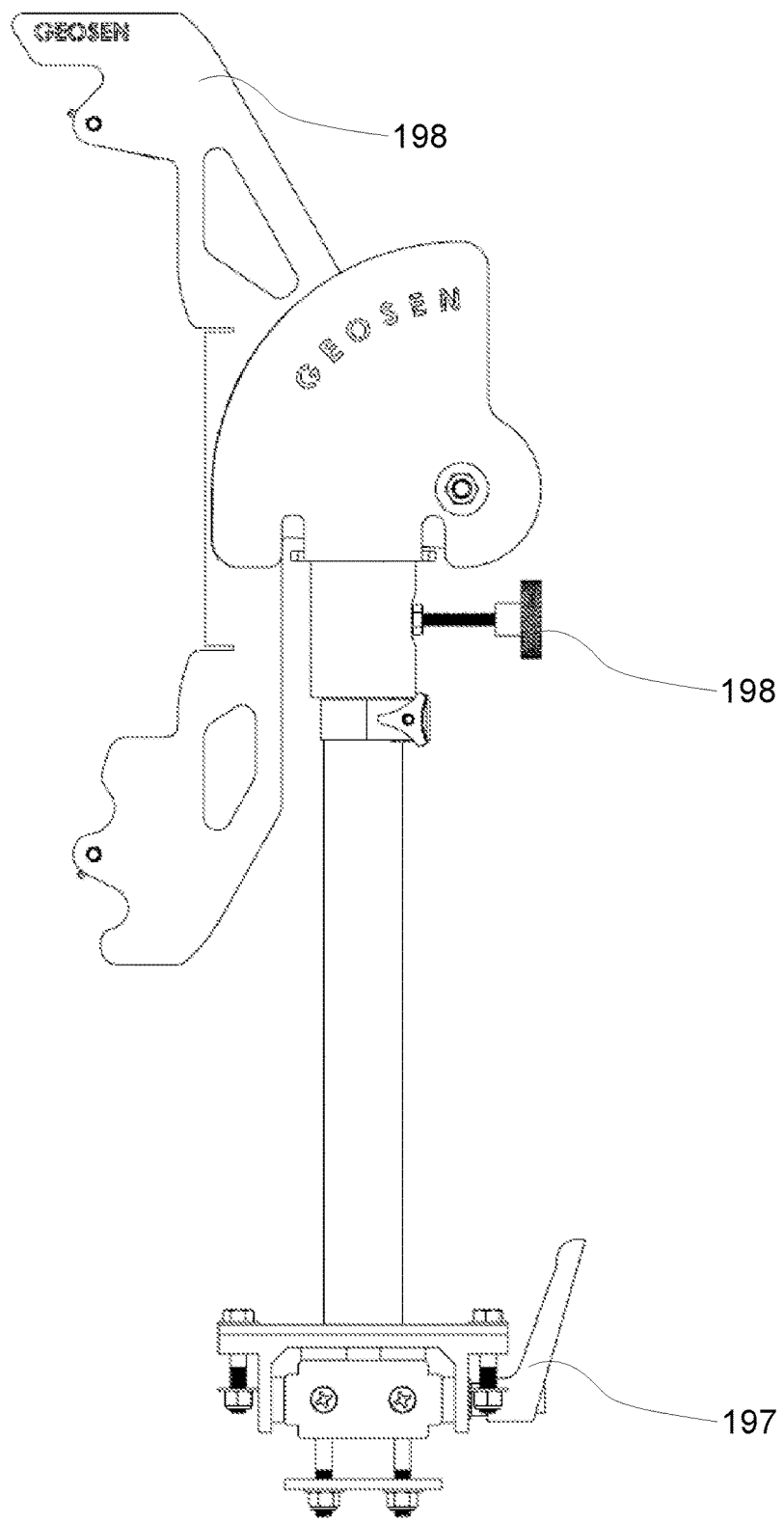
FIG. 22 is a right-side view thereof.

FIG. 20 is an isometric view of a different embodiment of the escalator handrail cleaner. In this embodiment, positional element 163 is coupled with a two-part base, wherein the lower portion 176 and the upper portion 177 are joined by fasteners 178, leaving a gap between the upper and lower base portions. In this embodiment, the mounting bracket 150 may be further positionable via thumbscrew 196, which can be turned to loosen or tighten a clamp to allow for the mounting bracket to be raised or lowered. FIG. 21 shows that, in some embodiments, the two-part base may be operatively coupled with a slider portion 179, which may be free standing or may be mounted to a floor or the cart base 170. Clamp 197 is operatively coupled with the two-part base, providing a locking mechanism by which the base can either be held in place or, when the clamp is released, permits the base to slide along the slider portion 179. FIG. 22 is a right side view of the slider embodiment, showing claim 197 in position relative to the two-part base and the slider, as well as thumb-screw 198, which is configured to allow the mounting bracket to be moved, tilted, removed, or replaced.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system for cleaning a handrail comprising:
    at least one arm with a far end and a near end;
    at least one socket coupled to the far end of the arm;
    at least one bracket coupled to the socket; and
    at least one cleaning element coupled to the bracket, the cleaning element comprising; a transverse axis and a longitudinal axis;
        a central portion that is flat along the transverse axis and curved along the longitudinal axis of the cleaning element;
        a first distal portion that is curved around the longitudinal axis; and
        a second distal portion opposite the first distal portion that is curved around the longitudinal axis.

2. The system for cleaning a handrail in claim 1, wherein the cleaning element disposed on the far end of the arm is configured to slide onto and off of the handrail at an end of the handrail.

3. The system for cleaning a handrail in claim 1, wherein the near end of the arm has a handle.

4. The system for cleaning a handrail in claim 1, wherein the near end of the arm is disposed on a support structure.

5. The system for cleaning a handrail in claim 4, wherein the arm is a first arm, and the cleaning element is a first cleaning element, the system further comprising:
    a second arm, the second arm disposed below the first arm, wherein a near end of the second arm is disposed on the support structure; and
    a second cleaning element disposed on a far end of the second arm;
    wherein the first cleaning element and the second cleaning element are substantially aligned through a vertical plane.

6. The system for cleaning a handrail of claim 1, wherein the bracket and cleaning element are coupled via a ball-and-socket joint.

7. The system for cleaning a handrail of claim 1, further comprising a fastener configured to be tightened to fasten the cleaning element in a fixed position.

8. A system for cleaning a handrail comprising:
    at least one cleaning element that is rigid, the cleaning element comprising; a transverse axis and a longitudinal axis;
        a central portion that is flat along the transverse axis and curved along the longitudinal axis of the cleaning element;
        a first distal portion that is curved around the longitudinal axis; and
        a second distal portion opposite the first distal portion that is curved around the longitudinal axis.

9. The system for cleaning a handrail in claim 8, wherein the at least one cleaning element substantially conforms to a shape of the handrail.

10. The system for cleaning a handrail in claim 8, further comprising an arm, wherein the cleaning element is removably coupled to the arm.

11. The system for cleaning a handrail in claim 10, further comprising a handle, wherein the cleaning element is removably coupled to a first end of the arm, and the handle is coupled to a second end of the arm.

12. The system for cleaning a handrail in claim 10, wherein the cleaning element is coupled to the arm using a ball-and-socket joint.

13. The system for cleaning a handrail in claim 10 further comprising a fastener configured to be tightened to fasten the cleaning element in a fixed position or loosened to fasten the cleaning element in a movable position.

14. The system for cleaning a handrail in claim 8, further comprising a cleaning cloth, wherein the cleaning cloth is removably coupled to the cleaning element.

15. A system for cleaning a handrail comprising:
   at least one arm with a first end and a second end;
   at least one mounting bracket disposed on the second end of the arm; and
   at least one cleaning element disposed on the mounting bracket, the cleaning element comprising; a transverse axis and a longitudinal axis;
      a central portion that is flat along the transverse axis and curved along the longitudinal axis of the cleaning element;
      a first distal portion that is curved around a longitudinal axis of the cleaning element; and
      a second distal portion opposite the first distal portion that is curved around the longitudinal axis.

16. The system for cleaning a handrail in claim 15, wherein the first end of the arm is disposed on at least one support structure, the system further comprising:
   at least one set of wheels disposed on an underside of the at least one support structure.

17. The system for cleaning a handrail in claim 15, wherein the arm is configured to rotate with respect to the cleaning element.

18. The system for cleaning a handrail in claim 15, wherein the mounting bracket and the cleaning element are coupled using a ball and socket joint.

19. The system for cleaning a handrail in claim 15 further comprising a fastener configured to be tightened to fasten the cleaning element in a fixed position or loosened to fasten the cleaning element in a movable position.

\* \* \* \* \*